US012530235B2

(12) United States Patent
Pignataro et al.

(10) Patent No.: US 12,530,235 B2
(45) Date of Patent: Jan. 20, 2026

(54) SUSTAINABLE RESOURCE OPTIMIZATION IN INFRASTRUCTURE LIFECYCLE MANAGEMENT

(71) Applicant: Cisco Technology, Inc., San Jose, CA (US)

(72) Inventors: Carlos Pignataro, Cary, NC (US); Nagendra Kumar Nainar, Morrisville, NC (US); Marcelo Yannuzzi, Nuvilly (CH); Ayan Banerjee, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 432 days.

(21) Appl. No.: 18/324,000

(22) Filed: May 25, 2023

(65) Prior Publication Data

US 2024/0394107 A1 Nov. 28, 2024

(51) Int. Cl.
  *G06F 9/50* (2006.01)
  *G06F 9/445* (2018.01)
  *G06F 11/34* (2006.01)
(52) U.S. Cl.
  CPC ........ *G06F 9/5033* (2013.01); *G06F 9/44505* (2013.01); *G06F 11/3495* (2013.01)
(58) Field of Classification Search
  None
  See application file for complete search history.

(56) References Cited

U.S. PATENT DOCUMENTS

| 2013/0290511 A1 | 10/2013 | Tu et al. |
| 2015/0350102 A1 | 12/2015 | Leon-Garcia et al. |

(Continued)

FOREIGN PATENT DOCUMENTS

| CN | 104301389 A | 1/2015 |
| WO | 2022045700 A1 | 3/2022 |

OTHER PUBLICATIONS

3GPP: "3rd Generation Partnership Project, Technical Specification Group TSG SA, Study on Energy Efficiency as Service Criteria (Release 19)", 3GPP Standard, Technical Report, 3GPP TR 22.882, 3rd Generation Partnership Project (3GPP), Mobile Competence Centre, 650, Route Des Lucioles, F-06921, Sophia-Antipolis Cedex, France, No. V1.0.0, Mar. 10, 2023, 27 Pages, XP052283940, Retrieved from https://ftp.3gpp.org/Specs/archive/22_series/22.882/22882-100.zip on Mar. 10, 2023, Chapters 4, 5.7, 5.8, Annex A.

(Continued)

*Primary Examiner* — Craig C Dorais
(74) *Attorney, Agent, or Firm* — Rutan & Tucker, LLP; Ravi Mohan

(57) ABSTRACT

Devices, systems, methods, and processes for sustainably reallocating resources based on within a plurality of computing nodes of a network, such as a managed network are described herein. Each computing node may be configured to transmit infrastructure data to an infrastructure monitor or ecosystem management tool. Additional sustainability data may also be accessed either internally or externally. The infrastructure data and sustainability data may be utilized to generate one or more scores that can be evaluated against each other. These scores may be configured to reflect various conditions or facts about the computing nodes including the overall sustainability. In order to increase sustainability levels, a variety of different resource configurations can be generated and evaluated against each other and the current configuration. When a more sustainable configuration is located, it may be applied by moving resources from originating computing nodes to destination computing nodes to achieve increased sustainability goals.

20 Claims, 14 Drawing Sheets

(56) References Cited

U.S. PATENT DOCUMENTS

| | | | |
|---|---|---|---|
| 2016/0232036 A1 | 8/2016 | Zhu et al. | |
| 2018/0063025 A1* | 3/2018 | Nambiar et al. | |
| 2020/0162337 A1* | 5/2020 | Jain | H04L 43/08 |
| 2020/0176122 A1* | 6/2020 | Teplitzky | G06N 3/04 |
| 2021/0027401 A1 | 1/2021 | Hovhannisyan et al. | |
| 2021/0328876 A1 | 10/2021 | Cherkas | |
| 2023/0067168 A1* | 3/2023 | Sharma | G06F 3/0486 |

OTHER PUBLICATIONS

International Search Report and Written Opinion for International Application No. PCT/US2024/030885, mailed Aug. 13, 2024, 17 Pages.

Yang C-S (Mediatek Inc)., et al., "A New Use Case on Supporting Carbon-Aware Communication Service", 3GPP TSG-SA WG1 Meeting #101, S1-230283, Type PCR, FS_Energyserv, 3rd Generation Partnership Project (3GPP), Mobile Competence Centre, 650, Route Des Lucioles, F-06921 Sophia-Antipolis Cedex, France, vol. 3GPP SA 1, No. Athens, GR, Feb. 20, 2023-Feb. 24, 2023, Feb. 10, 2023, XP052237007, 2 Pages, The Whole Document.

"Full Stack Visibility With IBM Turbonomic," https://www.ibm.com/products/turbonomic/full-stack, downloaded Feb. 24, 2022.

\* cited by examiner

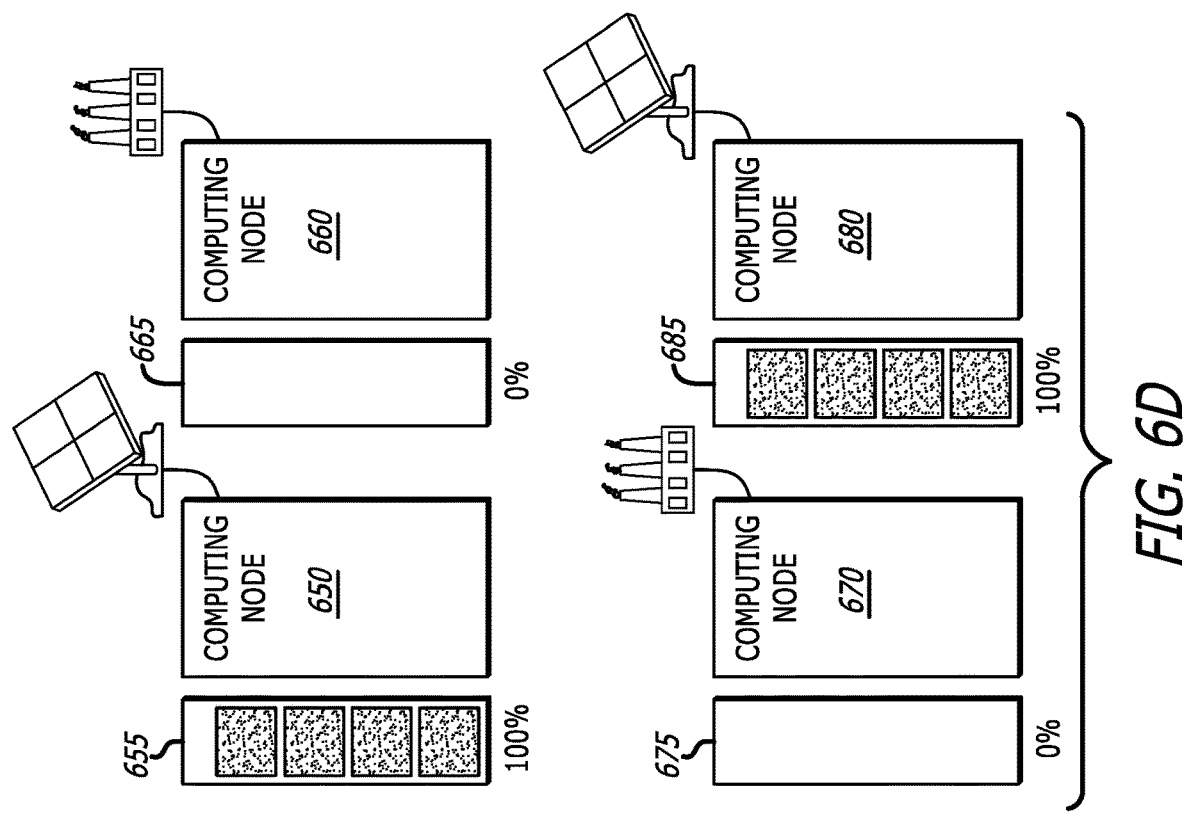
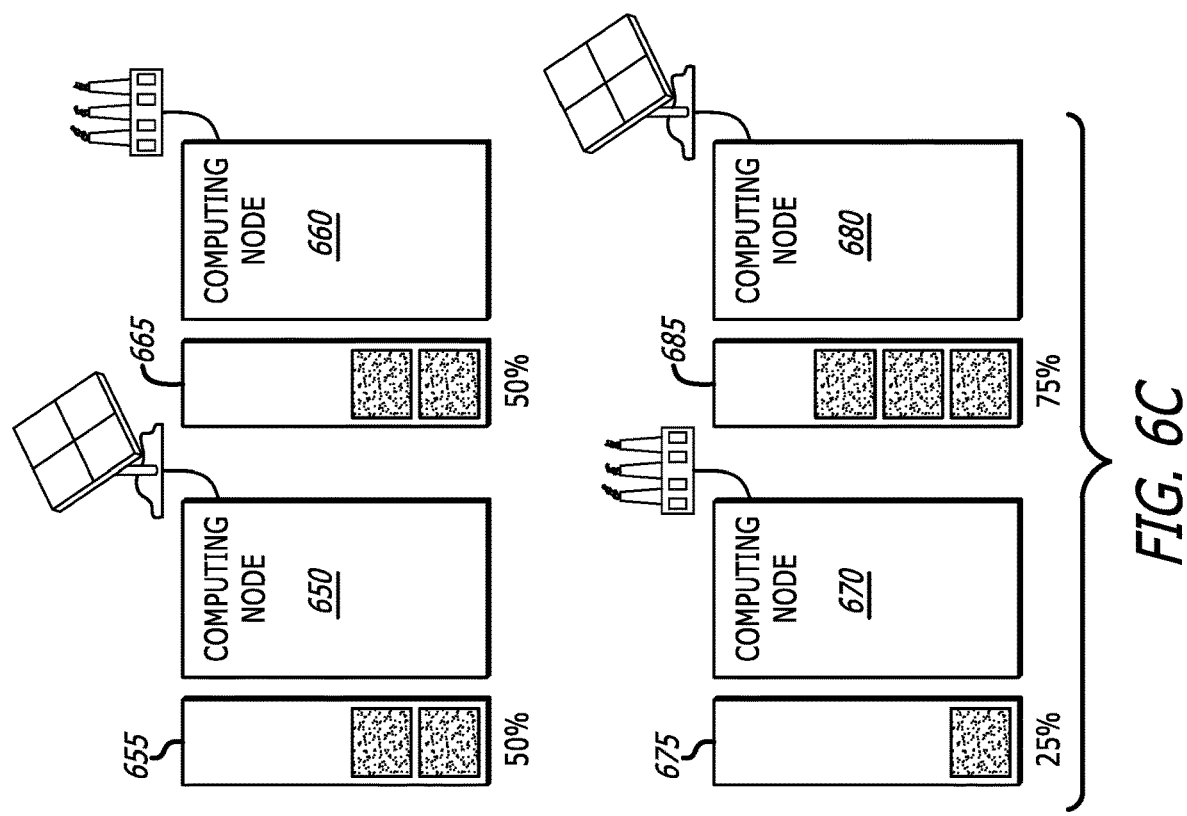
FIG. 6C
FIG. 6D

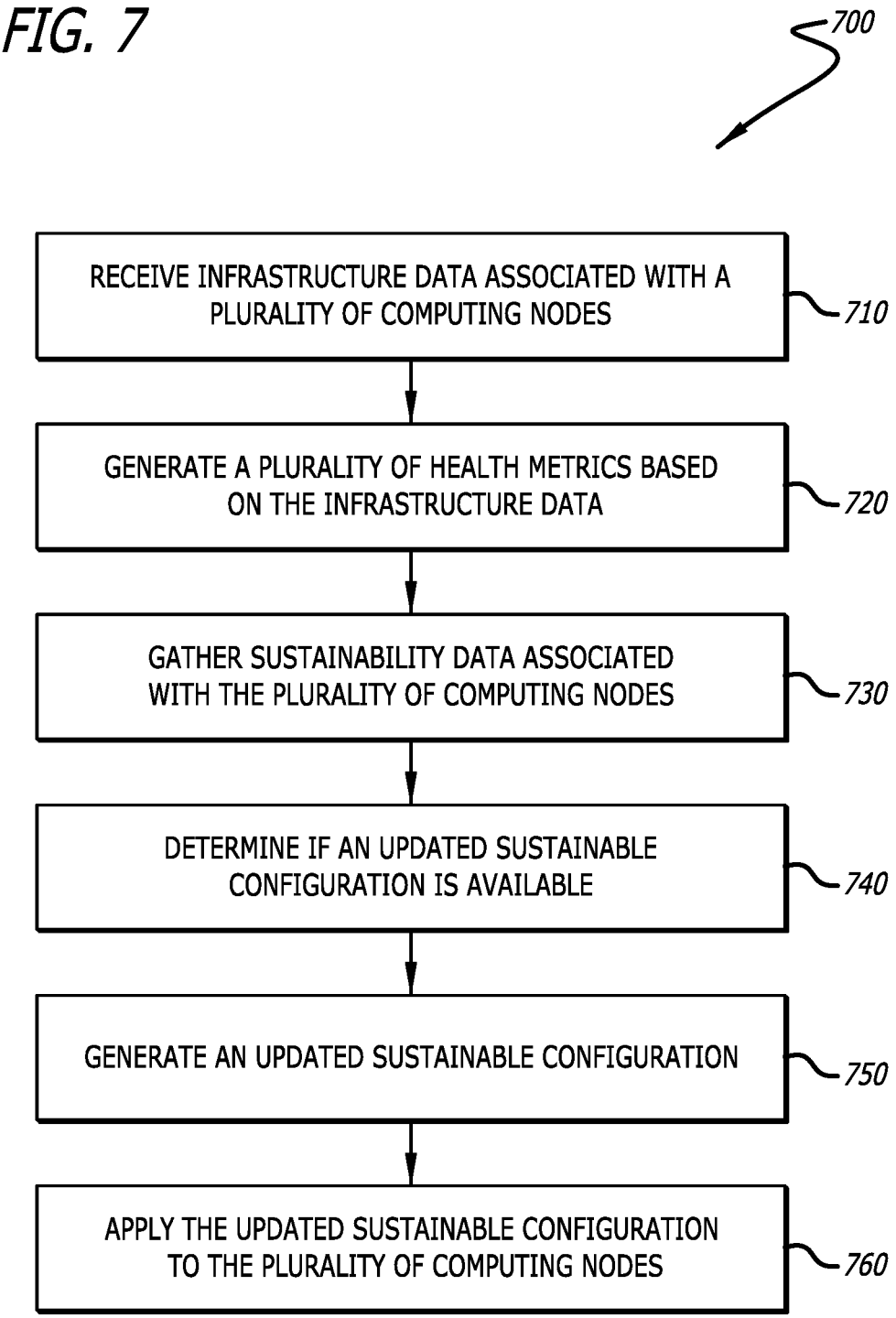

SUSTAINABLE RESOURCE OPTIMIZATION IN INFRASTRUCTURE LIFECYCLE MANAGEMENT

The present disclosure relates to managing network infrastructures. More particularly, the present disclosure relates to dynamically allocating resources between various computing nodes within a network based on one or more sustainability-related attributes.

BACKGROUND

Networking resource management tools can be utilized as applications designed to allocate and manage resources such as CPU, memory, and storage across multiple computing nodes in a network. These tools are critical for ensuring that computing resources are efficiently utilized, and applications are delivered reliably and with high performance. However, while these tools have been developed with a focus on optimizing resource usage and maximizing performance efficiency and/or reliability, they often neglect sustainability needs.

Infrastructure lifecycle management can often refer to the process of managing the various stages of a network infrastructure's existence, from its initial design and implementation to its eventual retirement or replacement. This includes planning, deploying, monitoring, maintaining, and optimizing the infrastructure to ensure that it meets the organization's needs for performance, security, and reliability. Workflow optimization is often undertaken during the lifecycle of the infrastructure in response to various events in order to make sure various metrics, service level agreements, and/or user experiences are met. However, maximizing these aspects can yield negative environmental effects if they are not tracked and/or utilized in the workflow optimization process.

SUMMARY OF THE DISCLOSURE

Systems and methods for dynamically allocating resources between various computing nodes within a network based on one or more sustainability-related attributes in accordance with embodiments of the disclosure are described herein. In some embodiments, a device, includes a processor, at least one network interface controller configured to provide access to a plurality of devices over a network, and a memory communicatively coupled to the processor. The memory can include a sustainability-related workflow management logic configured to receive infrastructure data associated with a plurality of computing nodes, generate a plurality of health metrics based on the infrastructure data, and gather sustainability data associated with the plurality of computing nodes. The sustainability-related workflow management logic can also determine if an updated sustainable configuration is available, generate an updated sustainable configuration, and apply the updated sustainable configuration to the plurality of computing nodes.

In some embodiments, the plurality of health metrics includes at least a health score for each of the plurality of computing nodes.

In some embodiments, the sustainability-related workflow management logic is further configured to generate a sustainability score for each of the plurality of computing nodes based on the generated health score and the received sustainability data.

In some embodiments, determining if an updated sustainable configuration is available includes: determining a current allocation of resources within the plurality of computing nodes; generating a proposed sustainable configuration with a reallocation of the resources between the plurality of computing nodes; evaluating the proposed sustainable configuration against the current allocation of resources; and selecting the proposed sustainable configuration, in response to the proposed sustainable configuration exceeding the current allocation of resources, as a candidate sustainable configuration suitable to apply to the plurality of computing nodes.

In some embodiments, the current allocation of resources is scored with a first score and the proposed sustainable configuration is scored with a second score.

In some embodiments, evaluating the proposed sustainable configuration against the current allocation of resources include comparing the first score and second score.

In some embodiments, the first score and second score are associated with one or more negative environmental impacts and includes summing up the aggregate negative environmental impacts of the plurality of computing nodes.

In some embodiments, the proposed sustainable configuration is selected as a candidate sustainable configuration when the first score exceeds the second score.

In some embodiments, the first score and second score are associated with one or more negative environmental impacts and includes summing up the aggregate avoidance of negative environmental impacts of the plurality of computing nodes.

In some embodiments, the proposed sustainable configuration is selected as a candidate sustainable configuration when the second score exceeds the first score.

In some embodiments, determining if an updated sustainable configuration is available further includes determining if all available configurations of the resources have been generated, and generating, in response to all available configurations of the resources having been generated, the updated sustainable configuration based on the candidate sustainable configuration.

In some embodiments, applying the updated sustainable configuration includes: determining a plurality of resources for reallocation within the current allocation of resources; locating one or more originating computing nodes associated with the plurality of resources for reallocation; determining one or more destination computing nodes associated with the plurality of resources for allocation; and transferring the plurality of resources for reallocation from the one or more originating computing nodes to the one or more destination computing nodes.

In some embodiments, a method, includes receiving infrastructure data associated with a plurality of computing nodes over a network, generating a plurality of health metrics based on the infrastructure data, gathering sustainability data associated with the plurality of computing nodes, and determining if an updated sustainable configuration is available for the plurality of computing nodes. The method can further include generating an updated sustainable configuration for the plurality of computing nodes, and applying the updated sustainable configuration to the plurality of computing nodes.

In some embodiments, a method, wherein the plurality of health metrics includes at least a health score for each of the plurality of computing nodes.

In some embodiments, the further includes generating a sustainability score for each of the plurality of computing nodes based on the generated health score and the received sustainability data.

In some embodiments, determining if an updated sustainable configuration is available includes: determining a current allocation of resources within the plurality of computing nodes; generating a proposed sustainable configuration with a reallocation of the resources between the plurality of computing nodes; evaluating the proposed sustainable configuration against the current allocation of resources; and selecting the proposed sustainable configuration, in response to the proposed sustainable configuration exceeding the current allocation of resources, as a candidate sustainable configuration suitable to apply to the plurality of computing nodes.

In some embodiments, a method, includes determining, through an infrastructure monitor, if an updated sustainable configuration is available for the plurality of computing nodes over a network, generating an updated sustainable configuration for the plurality of computing nodes wherein the updated sustainable configuration is associated with a plurality of resources suitable for reallocation, and transferring the updated sustainable configuration to a sustainable resource manager. The sustainable resource manager can be configured to locate the originating computing nodes associated with the plurality of resources to be reallocated, determine the destination computing nodes associated with the plurality of resources to be allocated, and transfer the plurality of resources to be reallocated from the originating computing nodes to the destination computing nodes.

In some embodiments, the updated sustainable configuration is configured to reallocate resources to reduce overall energy usage within the computing nodes.

In some embodiments, the reduction in overall energy usage of the computing nodes is achieved by reallocating resources to computing nodes that have a more energy-efficient processor.

In some embodiments, the updated sustainable configuration is configured to reallocate resources to reduce energy usage from non-sustainable power source types within the computing nodes.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The description of the present disclosure will be more fully understood with reference to the following figures, which are presented as exemplary embodiments of the disclosure and should not be construed as a complete recitation of the scope of the disclosure, wherein:

FIG. 6C is a conceptual illustration of a plurality of computing nodes with varying power source types in accordance with various embodiments of the disclosure;

FIG. 6D is a conceptual illustration of resource allocation based on power source types in accordance with various embodiments of the disclosure;

FIG. 7 is a flowchart depicting a process for generating and applying an updated sustainable configuration in accordance with various embodiments of the disclosure;

Figure 1:
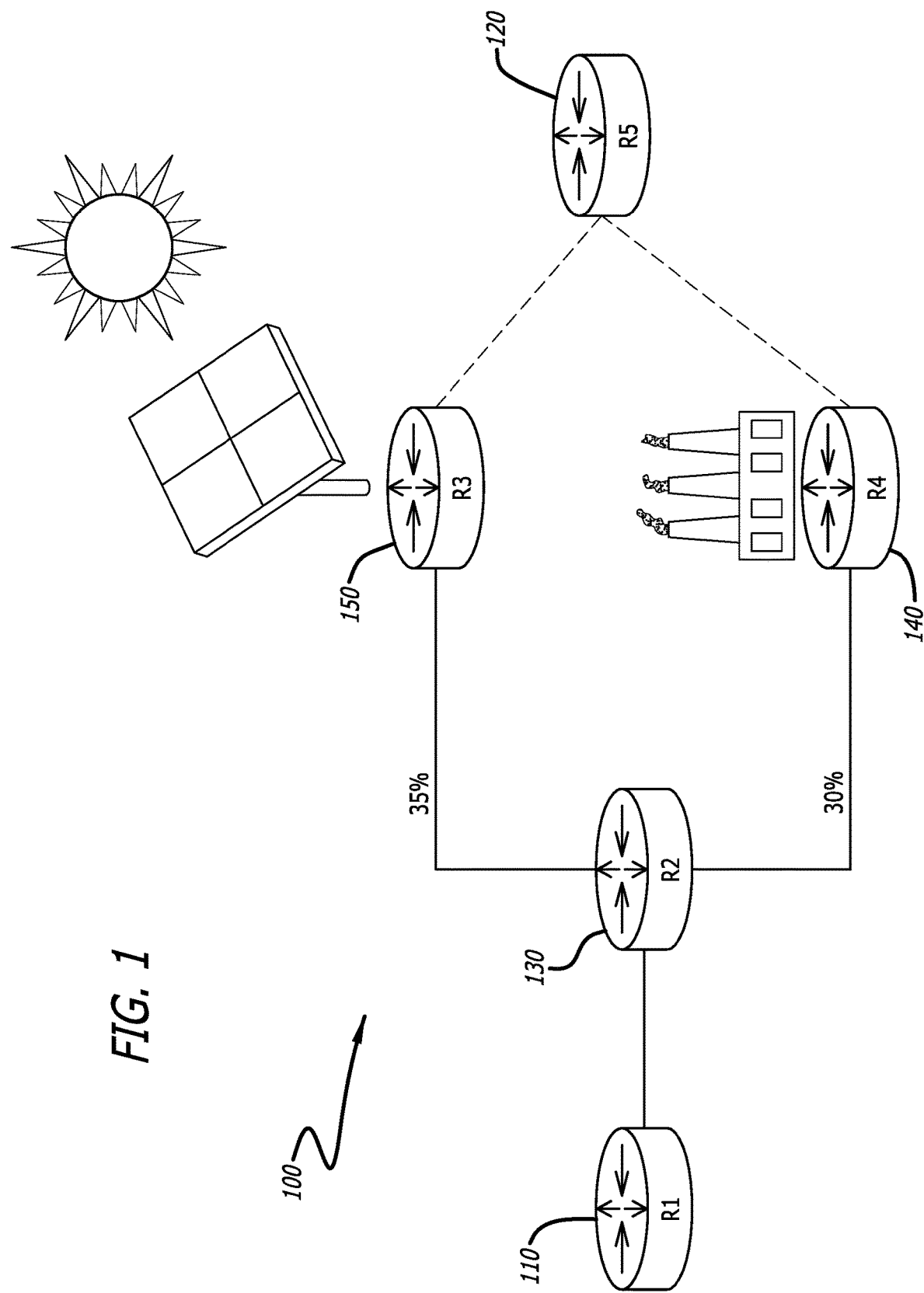
FIG. 1 is a conceptual diagram of a network comprising multiple network devices with various sources of power in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the problems described above, devices and methods are discussed herein that reallocate resources between various computing nodes within a network based on one or more sustainability attributes. Traditionally, resource allocation has been driven by the need for performance and efficiency, rather than sustainability. As a result, the tools and methods used to manage networking resources have not considered the environmental impact of resource usage, such as energy consumption and carbon footprint. With the increasing focus on sustainability and the need to reduce carbon emissions, it is becoming increasingly important to develop networking resource management tools that take sustainability into account. This involves developing tools that not only optimize resource usage but also minimize energy consumption and carbon footprint. By taking sustainability into account, these tools can help organizations reduce their environmental impact while still meeting their computing needs.

The tools to affect such sustainability reallocation can be realized through a specialized device, or through an ecosystem management tool, which may be provided via one or more cloud-based services. Ecosystem management tools can radically simplify application resource management with a single tool that can dynamically optimize resources in real-time or near real-time to ensure application performance. In some embodiments, the ecosystem management tool can continuously optimize critical network resources, resulting in more efficient use of existing infrastructure and lower operational costs on-premises and in the cloud. Based on applications described herein, the ecosystem management tool can take the guesswork out of planning for the future with the ability to quickly model different potential scenarios through proposed configurations based on the real-time or near real-time environment.

In a number of embodiments, the ecosystem management tool can continuously analyze workload consumption, costs, and compliance constraints and automatically allocate resources in real-time. In further embodiments, the ecosystem management tool can assure workload performance by giving workloads the resources they need when they need them. This can help with capacity planning and workload placement across multiple clouds.

Various embodiments may comprise an ecosystem management tool or similar device that can describe a real-time decision engine that ensures the health of applications across on-premises and public cloud environments while lowering costs. Corresponding software can continuously analyze workload demand, resource consumption, resource costs, and policy constraints to determine an optimal balance. The ecosystem management tool may have one or more supplemental tools that can make recommendations for network administrators and can trigger workload placement and resource allocations or reallocations in network locations, such as a data center and the public cloud, fully automating real-time optimization. With an ecosystem management tool, infrastructure and operations teams can be armed with visibility, insights, and actions that ensure service level agreements (SLAs) are met while improving the bottom line. This can deliver comprehensive situational awareness so network administrators can deliver high-performing and continuously available applications.

More specifically herein, a variety of embodiments can extend innovations the ecosystem management tool(s) may provide, often by adding one or more components. These components can attempt to gather information related to sustainability-related data, scores, or metrics. This additional data can be utilized together to make better sustainability-related decisions. This can be accomplished in some embodiments, by continuously collecting the metrics from different public-private clouds.

In many embodiments, variety of different components, logics, or other metrics that can be utilized to make sustainability-related decisions on resource allocation can be utilized. More specifically, some embodiments may comprise a server efficiency metric that can be calculated as a function of a server's workload, accelerator, service and/or watt/hour. In further embodiments, a $Co_2$ emission coefficient metrics can be calculated as a function of energy utilization, and/or the energy source type. In additional embodiments, a real-time power efficiency metric can be utilized by calculating a function of the current power source type and energy left. In still more embodiments, a network energy cost can be calculated based on at least the throughput per kilowatt hour, which can be reported by the devices and/or computing nodes themselves. In yet further embodiments, a network efficiency metric can be calculated as a function of the network link utilization, which may also be reported by the devices and/or computing nodes.

In a number of embodiments, periodic load and power consumption can be utilized as an input to predict when resources should be reallocated across multiple computing nodes. Resource utilization may be different during different actions, such as computing-at-rest or compute-in-action, may be used to calculate the utilization of a computing node during different times. Energy utilization and other sustainability data may also be calculated similarly. For example, a processor may utilize one-hundred watts of energy per hour while handling compute-at-rest (with no action) resources, while compute-in-action resources lead to the same processor utilizing two-hundred watts of energy per hour. An alternative computing node may have a processor that consumes eighty watts per hour at rest while utilizing one-hundred and fifty watts per hour while in action. As a result, the type of action currently, and in some embodiments predicted, being taken can be utilized as an input into which computing node (and associated processor) may be indicated to increase overall sustainability.

In more embodiments, the process of reallocation may be augmented with power-aware load-sharing in response to an incoming request such as the current power efficiency of the backend servers and the respective energy cost. Additional inputs such as device cooling/coolant source (either renewable or non-renewable, etc.), the current topology/infrastructure, and/or the overall carbon footprint of the network/resources may be utilized when making decisions related to reallocation resources amongst computing nodes with a network.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors, logics, or controllers. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, controller, logic, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component or element may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor, controller, and/or logic of a computer or other programmable data processing apparatus to produce a machine, such that the instructions, which execute via the processor, controller, logic, or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Referring to FIG. 1, a conceptual diagram of a network comprising multiple network devices with various sources of power in accordance with various embodiments of the disclosure is shown. The network 100 can include a plurality of devices, e.g., routers 110, 130, 140 and 150, which can be in communication with each other and/or a remote server, such as a cloud-based server 120. The network 100 depicted in FIG. 1 is shown as a simplified, conceptual network. Those skilled in the art will understand that a network 100 can include a large variety of devices and be arranged in a virtually limitless number of combinations based on the desired application and available deployment environment.

Additionally, it is recognized that the terms "power" and "energy" are often used interchangeably in many colloquial settings but have distinct differences. Specifically, energy is accepted as the capacity of a system or device to do work (such as in kilowatt-hours (kWh)), while power is the rate at which energy is transferred (often in watts (W)). Power represents how fast energy is being used or produced. With this in mind, it should be understood that various elements of the present disclosure may utilize common terms like "power lines," "power grids," power source," "power consumption," and "power plant" when describing energy delivery and utilization, even though those skilled in the art will recognize that those elements are delivering or processing energy (specifically electricity) at a certain rate of power. References to these terms are utilized herein specifically to increase the ease of reading.

Traditionally, devices operating within a network 100 have not considered various aspects of operation that can relate to the overall sustainability of the network. For example, devices in communication networks have often used grid-supplied energy as a primary power source. This grid-supplied energy can regularly provide energy that has been generated by a negative environmental impacts-heavy power source such as a coal-powered power plant. However, modern power grids often have more diverse and cleaner energy sources for the provided generated energy. Some devices can still be powered by power sources that utilize fossil fuels, such as the router R4 140 as depicted in FIG. 1. Alternatively, some devices can operate by using renewable sources of energy, such as the router R3 150 which is conceptually depicted as being powered by solar power.

Those skilled in the art will recognize that the generation of electricity within the various power plants often creates some pollution or, more generally, one or more negative environmental impacts, which can often come in the form of emissions. However, these negative environmental impacts can come in a variety of forms including, but not limited to, land use, ozone depletion, ozone formation inhibition, acidification, eutrophication (freshwater, marine, and terrestrial), abiotic resource depletion (minerals, metals, and fossil fuels), toxicity, water use, negative soil quality change, ionizing radiation, hazardous waste creation, etc. As such, these negative environmental impact measurements can be measured with specific units to quantify these changes. Various aspects of energy use can be associated with one or more of these negative environmental impacts and classified as one or more sustainability-related attributes.

In the embodiment depicted in FIG. 1, the operation of a coal-powered power plant will create a sizeable amount of negative environmental impacts in the form of carbon emissions and the like. Contrast that with a solar array which may not create emissions when generating electricity, but may negative environmental impacts, such as carbon emission generation, associated with the production and/or disposal of the solar array. Various methods of measuring these negative environmental impacts may occur. One measurement may be to examine the waste products created by the power generated (such as nuclear waste, vs. solar array e-waste, etc.).

Another measurement of negative environmental impacts that can be utilized when comparing power sources is to determine the amount of greenhouse or carbon emissions released per unit of electricity generated. Specifically, various embodiments described herein may utilize the $CO_{2e}$ kg/kWh metric which measure the amount of kilowatt hours produced per kilogram of carbon dioxide gases released into the environment. Therefore, when discussing a negative environmental impacts-heavy power source compared to a clean(er) power source, the clean power source can, for example, have a better $CO_{2e}$ kg/kWh rating compared to the negative environmental impacts-heavy power source. Utilizing a cleaner power source thus provides for a more sustainable network operation.

In order the maximize the overall sustainability of a network, it may be desirable to increase the use of cleaner power sources with a lower overall negative environmental impact as opposed to power sources with a higher overall negative environmental impact when operating the network. Thus, there can be a need to be aware of the source of energy provided at each device along the route of data travel. Additionally, other factors such as the attributes unique to each device can be factored in, along with the current and/or expected traffic, etc. Once known, an optimal method of traversing the data may need to be calculated. As discussed in more detail, this path algorithm can be utilized to better optimize the locations selected within a network for data travel.

Other methods may be utilized to increase sustainability in network operations. In many embodiments, the network devices themselves may have one or more features or other capabilities that can allow for a more efficient operation. For example, a network router may be operated in a lower power mode or be powered off entirely for a specific period of time or until an event occurs. Additional embodiments may utilize various other power-saving capabilities that can be turned on or off remotely or in response to an event or predetermined threshold being exceeded. Often, operations performed by the network devices can be utilized in scenarios where network performance will not be affected or is affected such that no loss in user experience occurs. By utilizing less power during operation, a higher level of sustainability can be achieved.

Together, the type of power source providing electricity to a network device, along with the various sustainability-related capabilities of the router can be understood as the sustainability-related attributes of that network device. During operation, one or more devices within the network may seek and collect the sustainability-related attributes of various network devices, which can provide insight into both the type of power source providing power to the device, but also the various capabilities of the network device that may be activated to provide more efficient operation. Additionally, when generating various scores, metrics, or other evaluations of the network devices within a network 100, the sustainability-related attributes can vary based on a variety of factors such as the time of day, current network traffic, expected network traffic, and historical usage patterns. For example, a network router may receive energy from a solar power source during the day but receives energy from a coal-powered power plant at night. In these instances, an averaged score may be used, or a unique score may be generated at the time of operation. In another example, network traffic may be such that removing one or more network devices from the optimal sustainable data paths may negatively affect user experiences, such as when a sporting event occurs. As such, scores may be generated at numerous times depending on the desired application. Often, the act of measurement may negatively affect sustainability such that determining the proper number of measurements for a given outcome may be determined.

Although a specific embodiment for a network 100 is described above with respect to FIG. 1, any of a variety of systems and/or processes may be utilized in accordance with embodiments of the disclosure. For example, the network 100 could be broken into a plurality of partitions, wherein each partition could have specific needs, service level agreements, etc. that can alter sustainability-optimization. The elements depicted in FIG. 1 may also be interchangeable with other elements of FIGS. 2-11 as required to realize a particularly desired embodiment.

Figure 2:
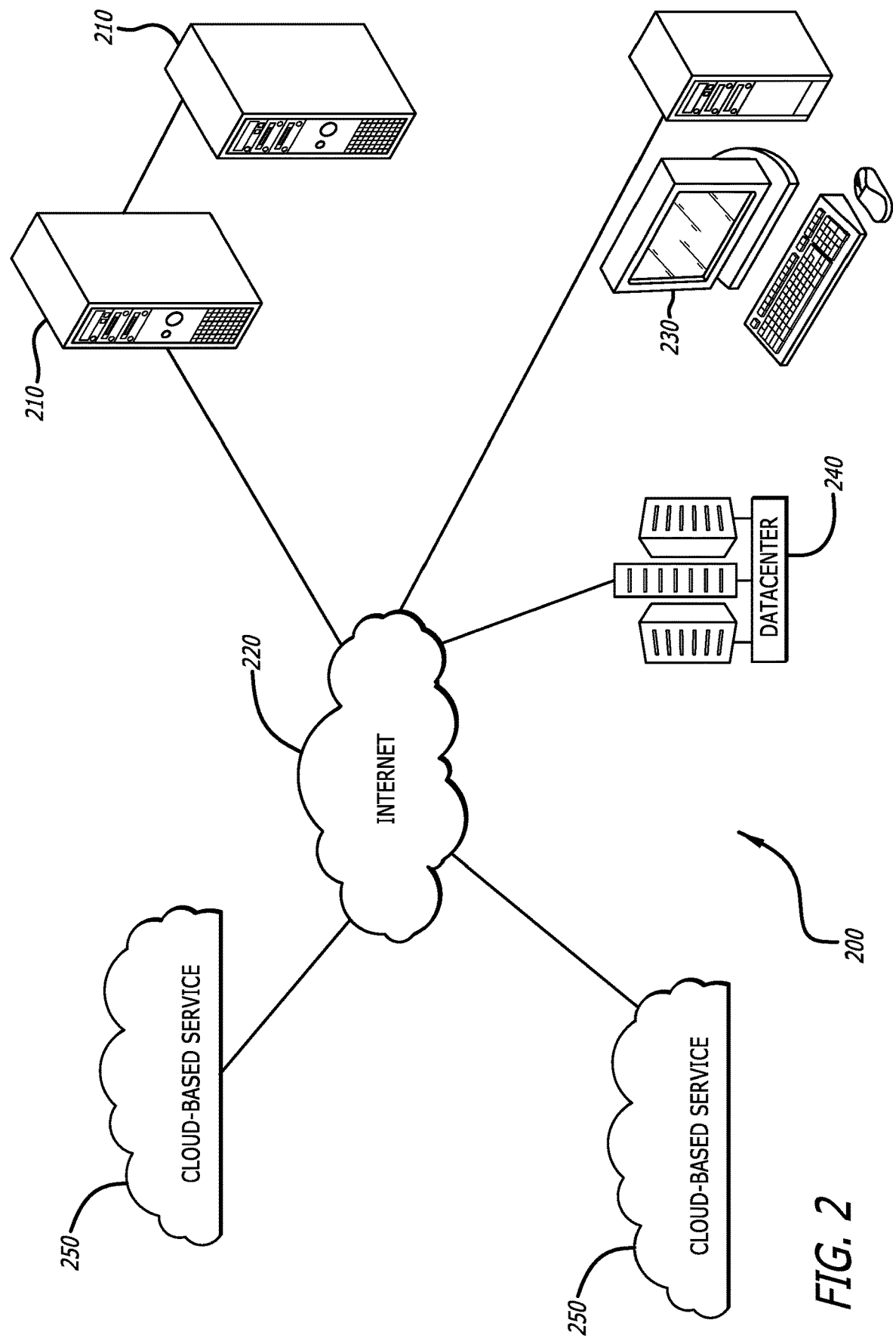
FIG. 2 is a conceptual illustration of a network with various devices and nodes suitable for sustainability-related workflow management in accordance with various embodiments of the disclosure.

Referring to FIG. 2, a conceptual illustration of a network 200 with various devices and nodes suitable for sustainability-related workflow management in accordance with various embodiments of the disclosure is shown. In many embodiments, the network 200 can be managed via a network administrator via an ecosystem management tool. These ecosystem management tools may be cloud-based or administered by a direct computing node, such as, but not limited to, an infrastructure monitor and/or a resource manager. However, as those skilled in the art will recognize, any variety of management tools, processes, or systems can be utilized by an administrator and/or an automated machine-learning process.

The network 200 may include various elements, such as the one or more cloud-based services 250, a data center 240, a plurality of servers 210, and general computing devices 230, such as those depicted in the embodiment shown in FIG. 2. Each element in the network 200 may be connected via a communication link over the Internet 220. A portion, or all of the elements of the network 200 may be managed within an administrative domain. In some embodiments, the processes, methods, and various embodiments described herein can be limited to an administered domain such that resources are reallocated based on a limited number of managed devices.

In a number of embodiments, the elements of the network 200 can include a plurality of computing nodes. As those skilled in the art will recognize, computing nodes can be a physical or virtual device that is connected to a network and has the capability to process, store, or transmit data over the network. Nodes can be configured into a variety of uses such as, but not limited to, a server, a workstation, a router, a switch, or any other networked device that can communicate with other nodes.

Computing nodes are often used in distributed computing systems, where a large task is divided into smaller sub-tasks, each of which is processed on a separate computing node. In these embodiments, the results can then be combined to produce the final output. This approach can improve performance and scalability, as well as enable fault tolerance and resilience. These computing nodes can have a plurality of resources associated with them. Over time, the resources may be configured to be applied to multiple elements within the network 200. However, one or more factors, such as sustainability-related factors, may change over time which can necessitate the need to reallocate the resources in order to maximize the overall network sustainability.

Although a specific embodiment for a network 200 is described above with respect to FIG. 2, any of a variety of systems and/or processes may be utilized in accordance with embodiments of the disclosure. For example, the network 200 could comprise any variety of datacenters, servers, datacenters, or general computing devices. Indeed, any such computing node may be accessible and/or managed by various embodiments described herein. The elements depicted in FIG. 2 may also be interchangeable with other elements of FIGS. 1 and 3-11 as required to realize a particularly desired embodiment. More details about the network 200 and computing nodes are described in more detail below.

Figure 3:
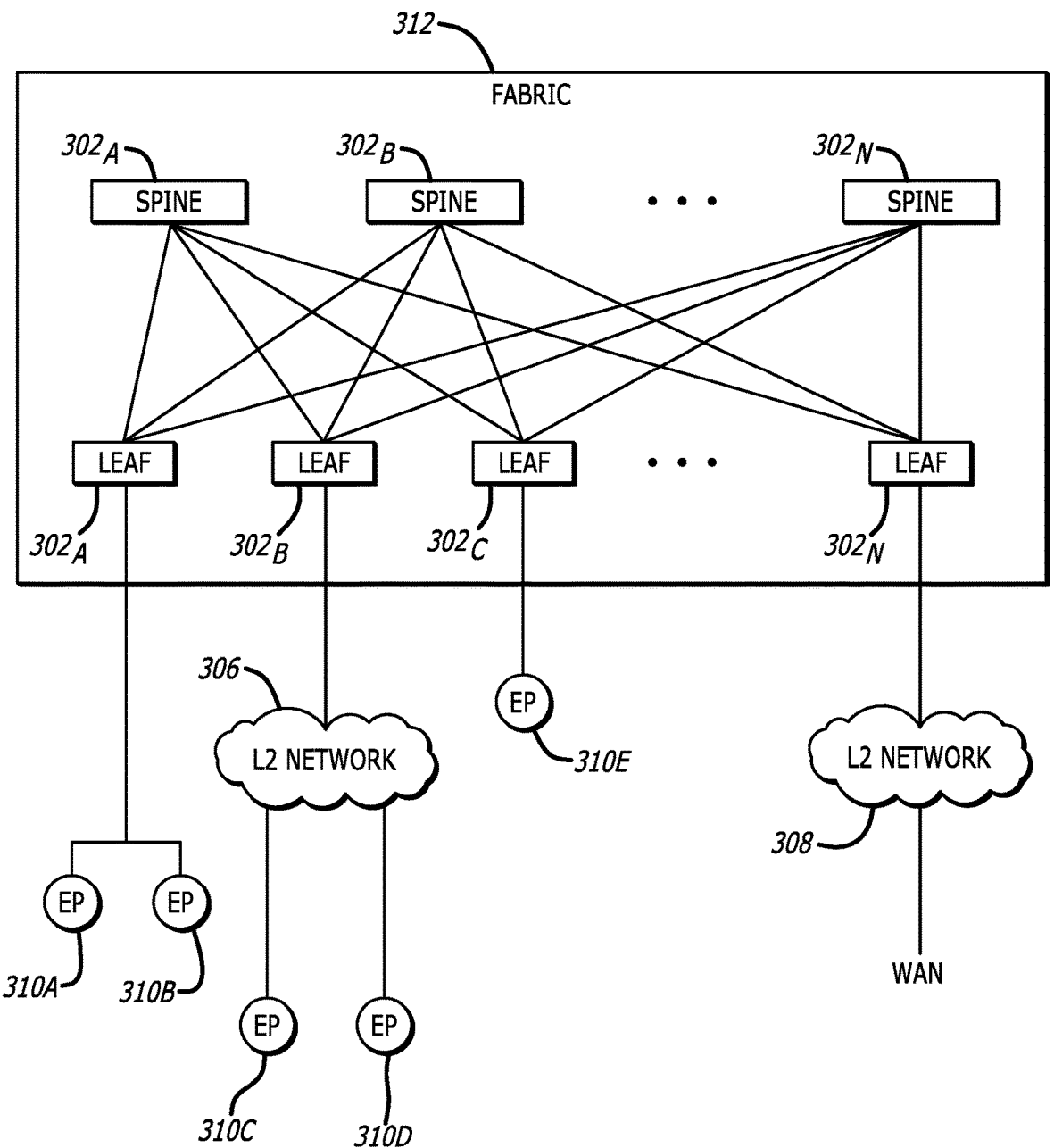
FIG. 3 is a conceptual schematic block diagram of an example architecture for a network fabric in accordance with various embodiments of the disclosure.

Referring to FIG. 3, a conceptual schematic block diagram of an example architecture 300 for a network fabric 312 in accordance with various embodiments of the disclosure is shown. The network fabric 312 can include spine switches 302$_A$, 302$_B$, . . . , 302$_N$ (collectively "302") connected to leaf switches 304$_A$, 304$_B$, 304$_C$ . . . 304$_N$ (collectively "304") in the network fabric 312. As those skilled in the art will recognize, networking fabric can refer to a high-speed, high-bandwidth interconnect system that enables multiple devices to communicate with each other efficiently and reliably. It is a network topology that is designed to provide a flexible and scalable infrastructure for data center, cloud environments, and other network elements.

Various embodiments described herein can include a leaf-spine architecture comprising a plurality of spine switches and leaf switches. Spine switches 302 can be L3 switches in the fabric 312. However, in some cases, the spine switches 302 can also, or otherwise, perform L2 functionalities. Further, the spine switches 302 can support various capabilities, such as, but not limited to, 40 or 10 Gbps Ethernet speeds. To this end, the spine switches 302 can be configured with one or more 40 Gigabit Ethernet ports. In certain embodiments, each port can also be split to support other speeds. For example, a 40 Gigabit Ethernet port can be split into four 10 Gigabit Ethernet ports, although a variety of other combinations are available.

In many embodiments, one or more of the spine switches 302 can be configured to host a proxy function that performs a lookup of the endpoint address identifier to locator mapping in a mapping database on behalf of leaf switches 304 that do not have such mapping. The proxy function can do this by parsing through the packet to the encapsulated tenant packet to get to the destination locator address of the tenant. The spine switches 302 can then perform a lookup of their local mapping database to determine the correct locator address of the packet and forward the packet to the locator address without changing certain fields in the header of the packet.

In various embodiments, when a packet is received at a spine switch $302_i$, wherein subscript "i" indicates that this operation may occur at any spine switch $302_A$ to $302_N$, the spine switch $302_i$ can first check if the destination locator address is a proxy address. If so, the spine switch $302_i$ can perform the proxy function as previously mentioned. If not, the spine switch $302_i$ can look up the locator in its forwarding table and forward the packet accordingly.

In a number of embodiments, one or more spine switches 302 can connect to one or more leaf switches 304 within the fabric 312. Leaf switches 304 can include access ports (or non-fabric ports) and fabric ports. Fabric ports can provide uplinks to the spine switches 302, while access ports can provide connectivity for devices, hosts, endpoints, VMs, or external networks to the fabric 312.

In more embodiments, leaf switches 304 can reside at the edge of the fabric 312, and can thus represent the physical network edge. In some cases, the leaf switches 304 can be top-of-rack ("ToR") switches configured according to a ToR architecture. In other cases, the leaf switches 304 can be aggregation switches in any particular topology, such as end-of-row (EoR) or middle-of-row (MoR) topologies. The leaf switches 304 can also represent aggregation switches, for example.

In additional embodiments, the leaf switches 304 can be responsible for routing and/or bridging various packets and applying network policies. In some cases, a leaf switch can perform one or more additional functions, such as implementing a mapping cache, sending packets to the proxy function when there is a miss in the cache, encapsulate packets, enforce ingress or egress policies, etc. Moreover, the leaf switches 304 can contain virtual switching functionalities, such as a virtual tunnel endpoint (VTEP) function as explained below in the discussion of FIG. 4. To this end, leaf switches 304 can connect the fabric 312 to an overlay network, such as overlay network 400 illustrated in FIG. 4.

In further embodiments, network connectivity in the fabric 312 can flow through the leaf switches 304. Here, the leaf switches 304 can provide servers, resources, endpoints, external networks, or VMs access to the fabric 312, and can connect the leaf switches 304 to each other. In some cases, the leaf switches 304 can connect endpoint groups to the fabric 312 and/or any external networks. Each endpoint group can connect to the fabric 312 via one of the leaf switches 304, for example.

Endpoints 310A-E (collectively "310", shown as "EP") can connect to the fabric 312 via leaf switches 304. For example, endpoints 310A and 310B can connect directly to leaf switch 304A, which can connect endpoints 310A and 310B to the fabric 312 and/or any other one of the leaf switches 304. Similarly, endpoint 310E can connect directly to leaf switch 304C, which can connect endpoint 310E to the fabric 312 and/or any other of the leaf switches 304. On the other hand, endpoints 310C and 310D can connect to leaf switch 304B via L2 network 306. Similarly, the wide area network (WAN) can connect to the leaf switches 304C or 304D via L3 network 308.

In certain embodiments, endpoints 310 can include any communication device, such as a computer, a server, a switch, a router, etc. In some cases, the endpoints 310 can include a server, hypervisor, or switch configured with a VTEP functionality which connects an overlay network, such as overlay network 400 below, with the fabric 312. For example, in some cases, the endpoints 310 can represent one or more of the VTEPs 408A-D illustrated in FIG. 4. Here, the VTEPs 408A-D can connect to the fabric 312 via the leaf switches 304. The overlay network can host physical devices, such as servers, applications, endpoint groups, virtual segments, virtual workloads, etc. In addition, the endpoints 310 can host virtual workload(s), clusters, and applications or services, which can connect with the fabric 312 or any other device or network, including an external network. For example, one or more endpoints 310 can host, or connect to, a cluster of load balancers or an endpoint group of various applications.

Although a specific embodiment for an architecture 300 is described above with respect to FIG. 3, any of a variety of systems and/or processes may be utilized in accordance with embodiments of the disclosure. For example, the architecture 300 could comprise any variety of endpoints, spine switches, and/or leaf switches. The elements depicted in FIG. 3 may also be interchangeable with other elements of FIGS. 1-2 and 4-11 as required to realize a particularly desired embodiment. More details about an overlay network are described in more detail below.

Figure 4:
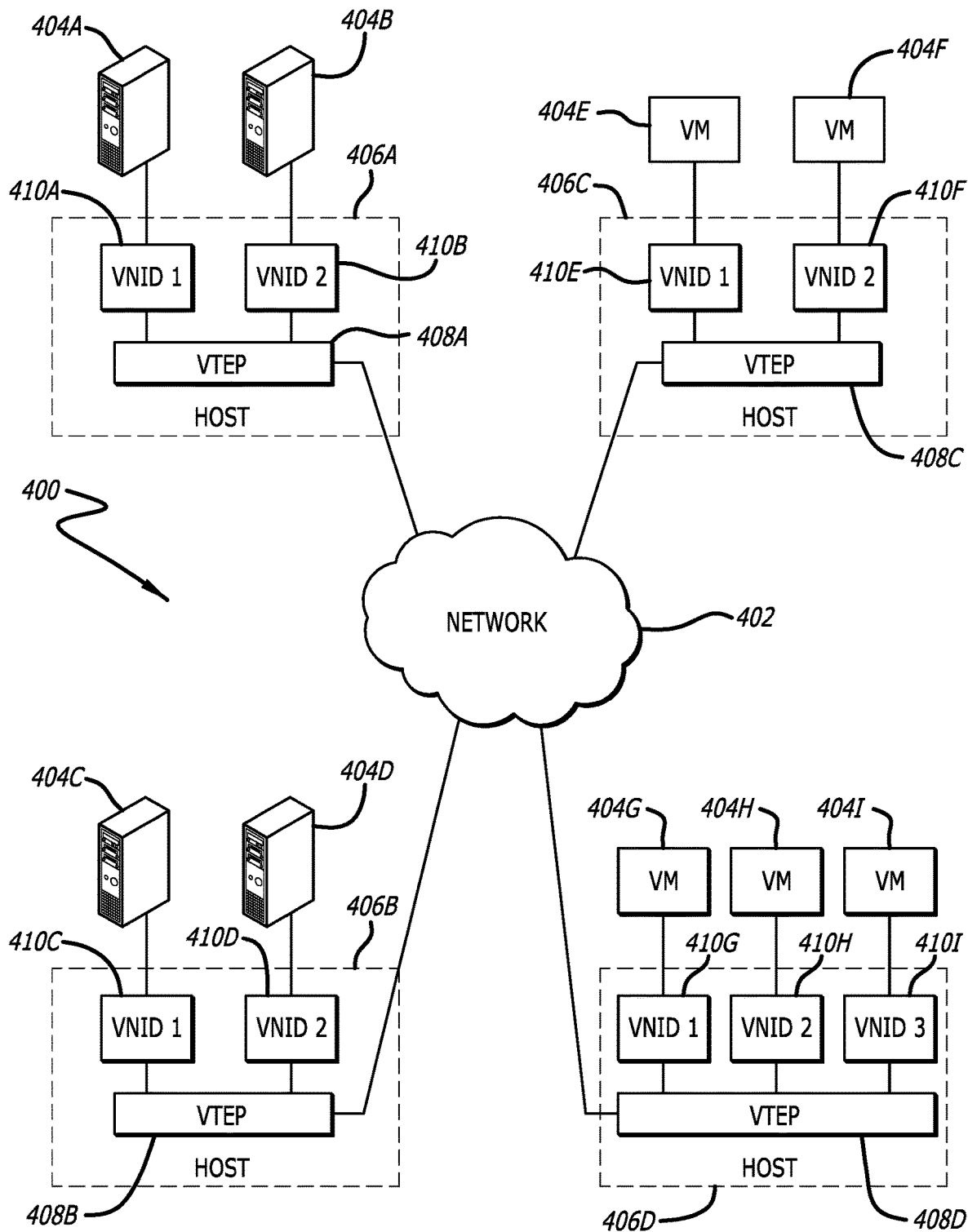
FIG. 4 is a conceptual schematic block diagram of an example overlay network in accordance with various embodiments of the disclosure.

Referring to FIG. 4, a conceptual schematic block diagram of an example overlay network 400 in accordance with various embodiments of the disclosure is shown. As those skilled in the art will recognize, an overlay network is often considered a logical network that is built on top of an existing physical network infrastructure. Overlay networks are typically created to provide additional services or functionality that the underlying physical network does not support. In an overlay network, each node on the network has a virtual address that is used to route traffic within the network. The virtual addresses are mapped to the physical addresses of the nodes using a mapping or translation mechanism, such as Network Address Translation (NAT).

In many embodiments, overlay networks can be created using a variety of different technologies, including, but not limited to, Virtual Private Networks (VPNs), software-defined networking (SDN), and peer-to-peer (P2P) networking. Some of the benefits of using an overlay network include increased security, improved scalability, and the ability to support new services and applications without requiring changes to the underlying physical network infrastructure. In a number of embodiments, the overlay network 400 can use an overlay protocol, such as VXLAN, VGRE, VO3, or STT, to encapsulate traffic in L2 and/or L3 packets which can cross overlay L3 boundaries within the network.

As illustrated in the embodiment depicted in FIG. 4, the overlay network 400 can include hosts 406A-D interconnected via a network 402. The network 402 can include a packet network, such as an IP network, for example. Moreover, the network 402 can connect the overlay network 400 with a fabric such as the fabric depicted in the embodiment discussed in FIG. 3. Hosts 406A-D can further include virtual tunnel end points (VTEP) 408A-D, which can be virtual nodes or switches configured to encapsulate and de-encapsulate data traffic according to a specific overlay protocol of the network 400, for the various virtual network identifiers (VNIDs) 410A-I. These, VTEPs 408A-D can connect with leaf switches in the fabric via network 402.

Moreover, hosts 406A-D can include servers containing a VTEP functionality, hypervisors, and physical switches, such as L3 switches, configured with a VTEP functionality. For example, hosts 406A and 406B can be physical switches configured to run VTEPs 408A-B. Here, hosts 406A and 406B can be connected to servers 404A-D, which, in some cases, can include virtual workloads through VMs loaded on the servers, for example.

In some embodiments, the network 400 can be a VXLAN network, and VTEPs 408A-D can be VXLAN tunnel end points (VTEP). However, as one of ordinary skill in the art will readily recognize, network 400 can represent any type of overlay or software-defined network, such as NVGRE, STT, or even overlay technologies yet to be invented.

The VNIDs can represent the segregated virtual networks in overlay network 400. Each of the overlay tunnels (VTEPs 408A-D) can include one or more VNIDs. For example, VTEP 408A can include VNIDs 1 and 2, VTEP 408B can include VNIDs 1 and 2, VTEP 408C can include VNIDs 1 and 2, and VTEP 408D can include VNIDs 1-3. As one of ordinary skill in the art will readily recognize, any particular VTEP can, in other embodiments, have numerous VNIDs, including more than the 3 VNIDs illustrated in FIG. 4.

The traffic in overlay network 400 can be segregated logically according to specific VNIDs. This way, traffic and/or resources intended for VNID 1 can be accessed by devices residing in VNID 1, while other devices residing in other VNIDs (e.g., VNIDs 2 and 3) can be prevented from accessing such traffic and/or. In other words, devices or endpoints connected to specific VNIDs can communicate with other devices or endpoints connected to the same specific VNIDs, while traffic and/or resources from separate VNIDs can be isolated to prevent devices or endpoints in other specific VNIDs from accessing data in different VNIDs.

Servers 404A-D and VMs 404E-I can connect to their respective VNID or virtual segment and communicate with other servers or VMs residing in the same VNID or virtual segment. For example, server 404A can communicate with server 404C and VMs 404E and 404G because they all reside in the same VNID, viz., VNID 1. Similarly, server 404B can communicate with VM endpoints 404F and 404H because they all reside in VNID 2. VMs 404E-I can host virtual workloads, which can include application workloads, resources, and services, for example. However, in some cases, servers 404A-D can similarly host virtual workloads through VMs hosted on the servers 404A-D. Moreover, each of the servers 404A-D and VMs 404E-I can represent a single server or VM, but can also represent multiple servers or VMs, such as a cluster of servers or VMs.

VTEPs 408A-D can encapsulate packets directed at the various VNIDs 1-3 in the overlay network 400 according to the specific overlay protocol implemented, such as VXLAN, so traffic can be properly transmitted to the correct VNID and recipient(s). Moreover, when a switch, router, or other network device receives a packet to be transmitted to a recipient in the overlay network 400, it can analyze a routing table, such as a lookup table, to determine where such packet needs to be transmitted so the traffic reaches the appropriate recipient. For example, if VTEP 408A receives a packet from endpoint server 404B that is intended for endpoint 404H, VTEP 408A can analyze a routing table that maps the intended endpoint, endpoint 404H, to a specific switch that is configured to handle communications intended for endpoint 404H. VTEP 408A might not initially know, when it receives the packet from endpoint server 404B, that such packet should be transmitted to VTEP 408D in order to reach endpoint 404H. Accordingly, by analyzing the routing table, VTEP 408A can lookup endpoint 404H, which is the intended recipient, and determine that the packet should be transmitted to VTEP 408D, as specified in the routing table based on endpoint-to-switch mappings or bindings, so the packet can be transmitted to, and received by, endpoint 404H as expected.

However, continuing with the previous example, in many instances, VTEP 408A may analyze the routing table and fail to find any bindings or mappings associated with the intended recipient, e.g., endpoint 404H. Here, the routing table may not yet have learned routing information regarding endpoint 404H. In this scenario, the VTEP 408A may likely broadcast or multicast the packet to ensure the proper switch associated with endpoint 404H can receive the packet and further route it to endpoint 404H. In some cases, the routing table can be dynamically and continuously modified by removing unnecessary or stale entries and adding new or necessary entries, in order to maintain the routing table up-to-date, accurate, and efficient, while reducing or limiting the size of the table.

Although a specific embodiment for an overlay network 400 is described above with respect to FIG. 4, any of a variety of systems and/or processes may be utilized in accordance with embodiments of the disclosure. For example, depending on the desired implementation in the overlay network 400, a variety of networking and messaging protocols may be utilized, including but not limited to TCP/IP, open systems interconnection (OSI), file transfer protocol (FTP), universal plug and play (UPnP), network file system (NFS), common internet file system (CIFS), AppleTalk etc. As one of ordinary skill in the art will readily recognize, the examples and technologies provided above are simply for clarity and explanation purposes, and can include many additional concepts and variations. The elements depicted in FIG. 4 may also be interchangeable with other elements of FIGS. 1-3 and 5A-11 as required to realize a particularly desired embodiment. More details about resource allocation are described below.

Figure 5A:
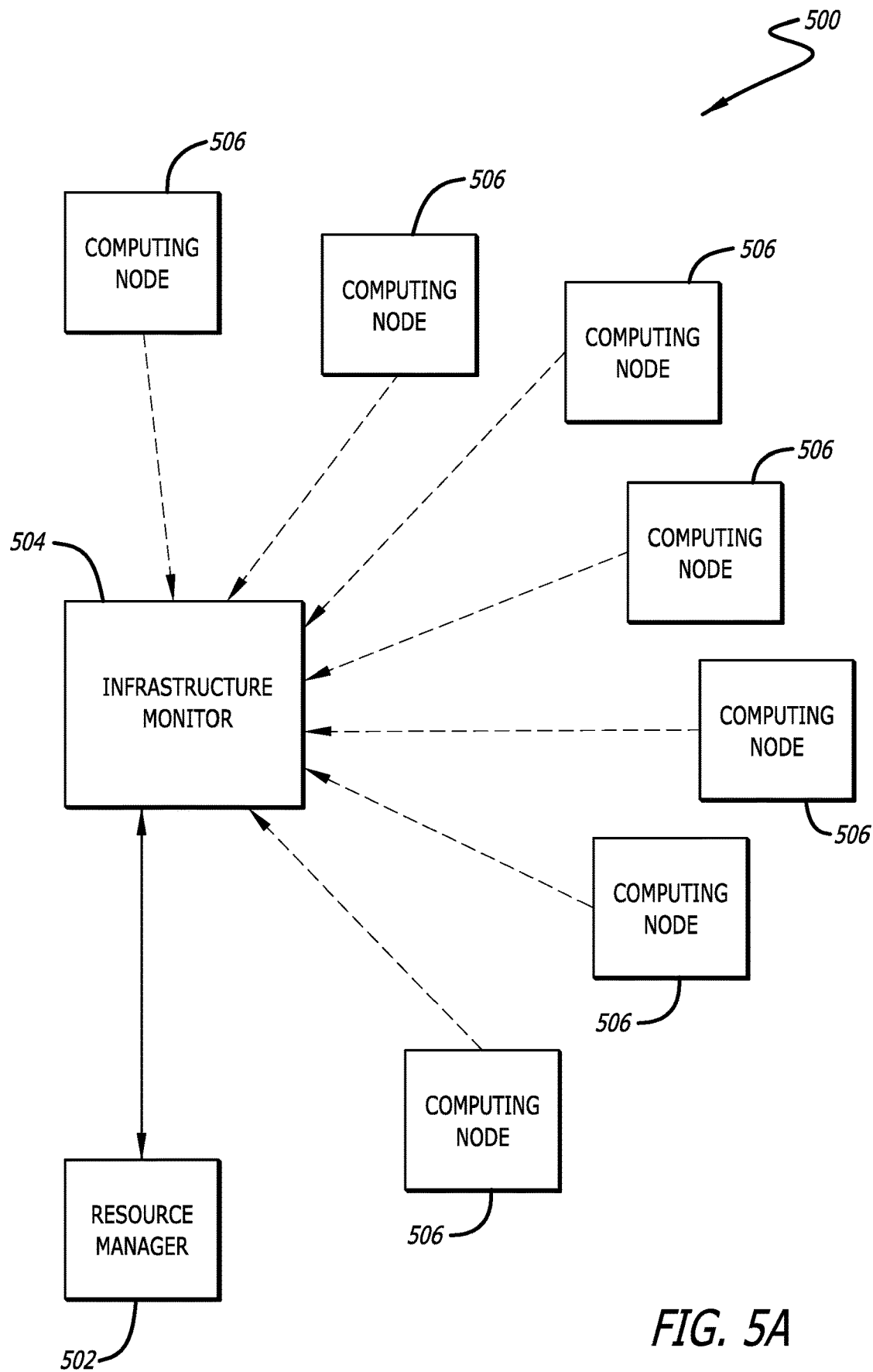
FIG. 5A is a conceptual illustration of an example of sustainability-aware resource allocation system in accordance with various embodiments of the disclosure.

Referring to FIG. 5A, a conceptual illustration of an example of sustainability-aware resource allocation system 500 in accordance with various embodiments of the disclosure is shown. Having disclosed a brief introductory description of exemplary systems and networks within FIGS. 1-4, FIGS. 5A and 5B depict an example of sustainability-aware adaptive resource allocation. As shown in the embodiment depicted in FIG. 5A, the sustainability-aware resource allocation system 500 can include a resource manager 502, an infrastructure monitor 504 and a plurality of computing nodes 506 (collectively). The plurality of computing nodes 506 can be any type of computing nodes included in a data center, hybrid cloud, or other similar location. They may be configured to operate as a number of different devices, such as, but not limited to, servers, switches, routers, storage (e.g., all compute network or storage devices). Although only seven computing nodes 506 are shown in the embodiment depicted in FIGS. 5A and 5B, this is just an example, and not meant to be limiting. As such, the sustainability-aware resource allocation system 500 can include any number of computing nodes 506 as needed to realize the desired application.

In a number of embodiments, the computing nodes 506 can be configured to host a plurality of resources. For example, computing nodes 506 can be configured to resources, such as, but not limited to, container instances, that provide micro-services of one or more applications. In various embodiments, the resource manager 502 can be configured to manage the allocation of resources in the sustainability-aware resource allocation system 500. By way of non-limiting example, the resource manager 502 can be configured to allocate a new plurality of resources, remove a plurality of resources, relocate resources, etc. In further embodiments, the resource manager 502 can communicate with an infrastructure monitor 504 to provide sustainability-aware adaptive resource allocation.

As shown, the infrastructure monitor 504 can be configured to communicate with the plurality of computing nodes 506 to receive data. In many embodiments, this data can include, but is not limited to, infrastructure data. The infrastructure monitor 504 can be configured as a computing device or application to which the plurality of computing nodes 506 may periodically communicate metrics, scores, and other data. In certain embodiments, the infrastructure monitor 504 can be implemented as part of a Software Defined Networking (SDN) application or as a part of any resource manager or ecosystem management tool framework itself using one or more available technologies such as OpenFlow, SNMP, OnePK, ResetAPl, XMLApi, etc., to communicate and retrieve infrastructure data.

Infrastructure data can be data describing the individual computing nodes 506 as well as their underlying infrastructure. For example, infrastructure data can include CPU availability, CPU power rating, memory usage, drive failures (e.g., storage down), infrastructure related events (e.g., power failures, network down, etc.), network latencies, RX/TX errors, bandwidth, QOS, packets dropped, power issues, current resource allocation, total resource queue processing bandwidth available, quarantined portions of the network, network security issues, etc. In some embodiments, the infrastructure monitor 504 can continuously monitor and collect infrastructure data from the computing nodes and store the infrastructure data in tables.

In various embodiments, the infrastructure monitor 504 can utilize the received infrastructure data to determine health metrics for each of computing nodes 506. Health metrics can be data that indicates or can be used to derive the health of computing nodes 506 to host a plurality of resources. For example, health metrics can be data that indicates whether a computing node 506 is experiencing performance issues or, alternatively, performing at or near an optimal level. In further embodiments, health data can be utilized to determine the overall energy usage to process the plurality of resources.

In some embodiments, the health metrics for a computing node 506 can include a health score calculated by infrastructure monitor 504. A health score can be a score, such as a numerical value, that indicates the health of a computing node 506 to host a plurality of resources. For example, a low health score may indicate that a computing node 506 is experiencing performance issues, while a high health score can indicate that a computing node 506 is performing at an optimal or near optimal level. In additional embodiments, a low health score may indicate that the computing node 506 may utilize a higher-than-average amount of energy to process various resources allocated to it. Conversely, a lower health score may be configured to indicate that the computing node 506 is operating an above-average efficiency compared to other available computing nodes.

In some embodiments, the infrastructure monitor 504 can calculate a health score for a computing node 506 in any way and based on any number of factors. In some embodiments, infrastructure monitor 504 can calculate individual scores for multiple factors and calculate the health score for a computing node 506 based on the individual scores. An individual score can be a score assigned to a combination of one or more factors. For example, an individual score can be assigned for an individual factor such as network latency. The individual score for latency can indicate latency experienced by the computing node. For example, a low individual score for latency can indicate that the computing node is not experiencing latency, whereas a high individual score for latency can indicate that the computing node is experiencing high latency. As another example, an individual score can be assigned for a factor such as packets dropped, and the score can indicate a number to indicate the severity of packet drops detected.

In more embodiments, the infrastructure monitor 504 can add the individual scores together to calculate the health score. As another example, infrastructure monitor 504 can determine the mean of the individual scores to calculate the health score for a computing node 506.

As another example, infrastructure monitor 504 can reduce and/or increase a baseline score based on the infrastructure data to calculate the health score. For example, infrastructure monitor 504 can begin with a baseline score of 100 and increase the score based on infrastructure data indicating that a computing node 506 is not performing well, such as detected errors, failures, or increased latencies. Likewise, infrastructure monitor 504 can reduce the baseline score of 100 based on infrastructure data indicating that a computing node 506 is performing well. In some embodiments, infrastructure monitor 504 can apply weights when reducing and/or increasing the base line score. For example, infrastructure monitor 504 can reduce the baseline score by a weighted amount based on the type or severity of the detected problem.

In still further embodiments, the infrastructure monitor 504 can apply varying weights to the individual scores when calculating the health score. For example, individual scores for factors considered to be of greater importance can be assigned a higher weight and therefore have greater influence on the health score. Conversely, individual scores for factors considered to be of lower importance can be assigned a lower weight and have a lesser impact on the health score.

In addition to calculating health scores for computing nodes 506, infrastructure monitor 504 can also categorize the computing nodes based on the health scores. The infrastructure monitor can categorize the computing nodes into one of a white list, grey list, or black list, which represent the relative health of computing nodes 506. Categorizing a computing node 506 in the white list can indicate that the computing node 506 is performing at an optimal or near optimal level (e.g., not having any major problems, latencies are within an expected range, no identified security events, do not have any problems in the upstream either with network or power or security). Being categorized in the grey list can indicate that a computing node 506 is not experiencing any major problems but there are some minor problems (e.g., slight increase in latencies, minor power or heating issues, new network security or resource events not yet classified as major problems, etc.). Being categorized in the black list can indicate that a computing node 506 has major alerts or problems (e.g., major problems in the upstream, ToR or switch with flapping ports, reduced bandwidth, events categorized as major issues, security alerts, etc.)

Figure 5B:
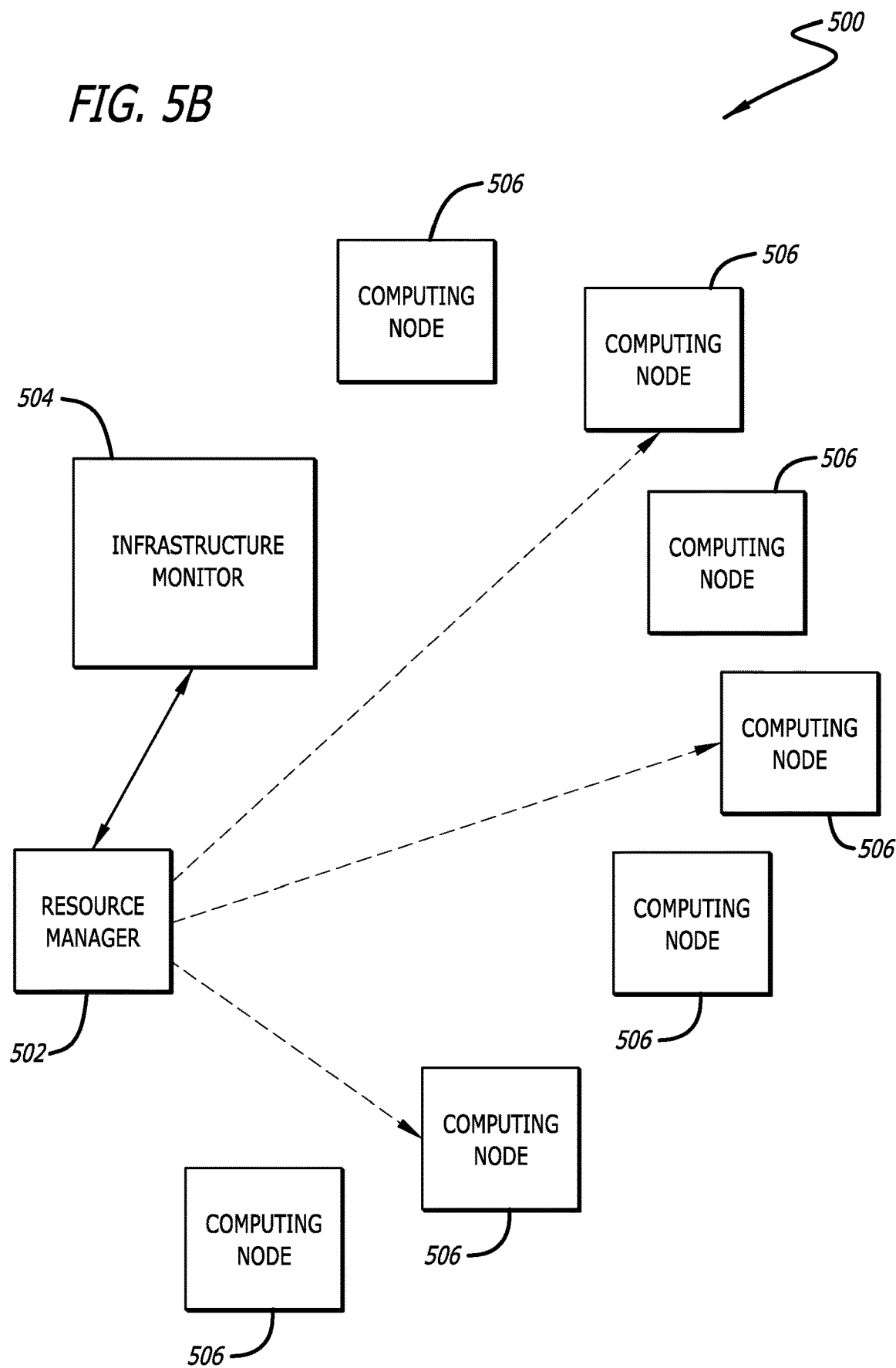
FIG. 5B is a conceptual illustration of an example of allocating resources within a sustainability-aware resource allocation system in accordance with various embodiments of the disclosure.

Referring to FIG. 5B, a conceptual illustration of an example of allocating resources within a sustainability-related workflow management system in accordance with various embodiments of the disclosure is shown. In many embodiments, resource manager 502 can be configured to work with the infrastructure monitor 504 to allocate a plurality of resources. For example, resource manager 502 can be configured to receive a request to allocate a new resources based on a change in one or more sustainability attributes. In response, resource manager 502 can determine a set of candidate or destination computing nodes 506 that are capable of hosting the new resources. For example, resource manager 502 can maintain data identifying originating computing nodes 506 and use an algorithm to select the set of destination computing nodes 506.

In more embodiments, the resource manager 502 can communicate with infrastructure monitor 504 to request health metrics for the set of destination computing nodes 506. In response, the infrastructure monitor 504 can search its database to gather health metrics, including health scores and classifications, for the requested computing nodes 506 and provide the health metrics to resource manager 502. In additional embodiments, the resource manager 502 can then use the received health metrics to select an optimal computing node 506 from the set of destination computing nodes 506 to host the new container instance. For example, resource manager 502 can determine a number of network issues associated with each destination computing node, and select the destination computing node with the least number of network issues as the optimal computing node. As another example, the resource manager 502 may select a destination computing node that is categorized in the white list as the optimal computing node. As another example, resource manager 502 can select a candidate computing node with the highest health score as the optimal computing node.

After determining that a more-sustainable computing node or more sustainable sustainability profile is available, the resource manager 502 can communicate with the destination computing node to allocate the new container instance in the optimal computing node. As shown in FIG. 5B, the resource manager 502 can communicate with the plurality of computing nodes 506 to allocate a plurality of resources.

In certain embodiments, resource manager 502 can also continually monitor computing nodes 506 and proactively move a plurality of resources if needed. For example, resource manager 502 can periodically query infrastructure monitor 504 for health metrics for computing nodes 506 and determine whether any computing nodes have their sustainability-related attributes change such that a new sustainable power configuration may be needed. For example, the resource manager can detect various events, such as a device failure, switch or power distribution failure, or increased CPU usage, which can create a hotspot in the existing infrastructure. In these embodiments, the resource manager 502 can relocate a plurality of resources away from and/or allocate new a plurality of resources around this hotspot. As another example, the resource manger 502 can detect a power consumption increase in a specific location of the data center. Resource manager 502 can proactively relocate a plurality of resources hosted on computing nodes 506 in this affected area to computing nodes 506 in unaffected areas.

Although specific embodiments for sustainability-related workflow management systems 500 are described above with respect to FIGS. 5A and 5B, any of a variety of systems and/or processes may be utilized in accordance with embodiments of the disclosure. As one of ordinary skill in the art will readily recognize, the examples and technologies provided above are simply for clarity and explanation purposes and can include many additional concepts and variations. The elements depicted in FIGS. 5A and 5B may also be interchangeable with other elements of FIGS. 1-4 and 6-11 as required to realize a particularly desired embodiment. More details about resource allocation are described below.

Figure 6B:
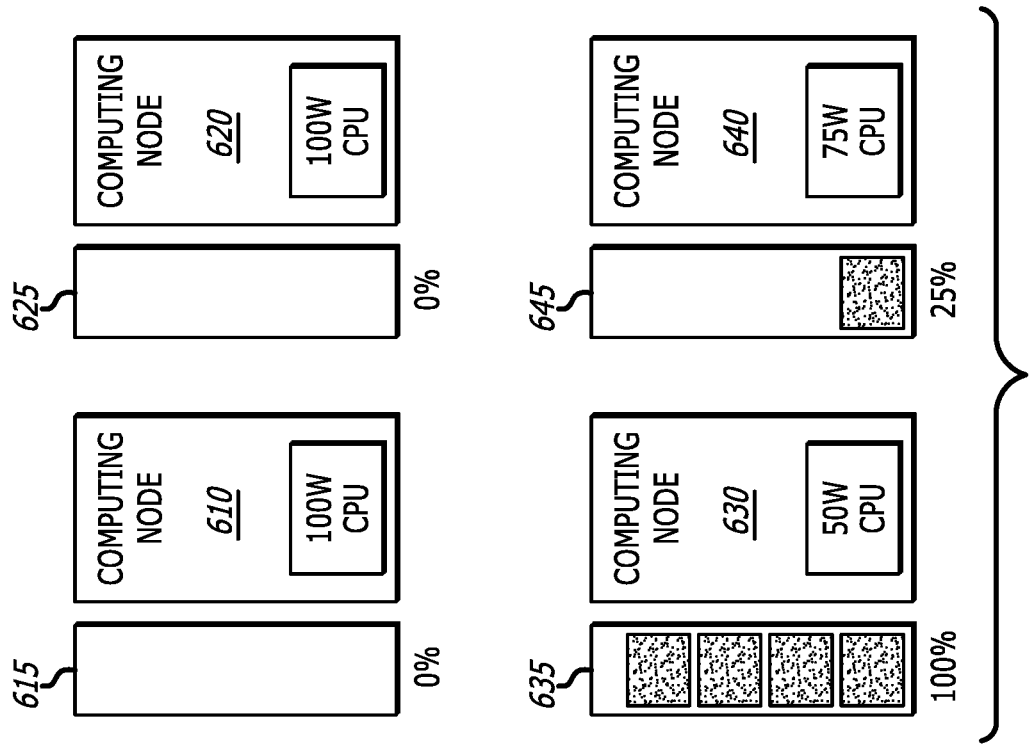
FIG. 6B is a conceptual illustration of resource allocation based on energy usage in accordance with various embodiments of the disclosure.
Figure 6A:
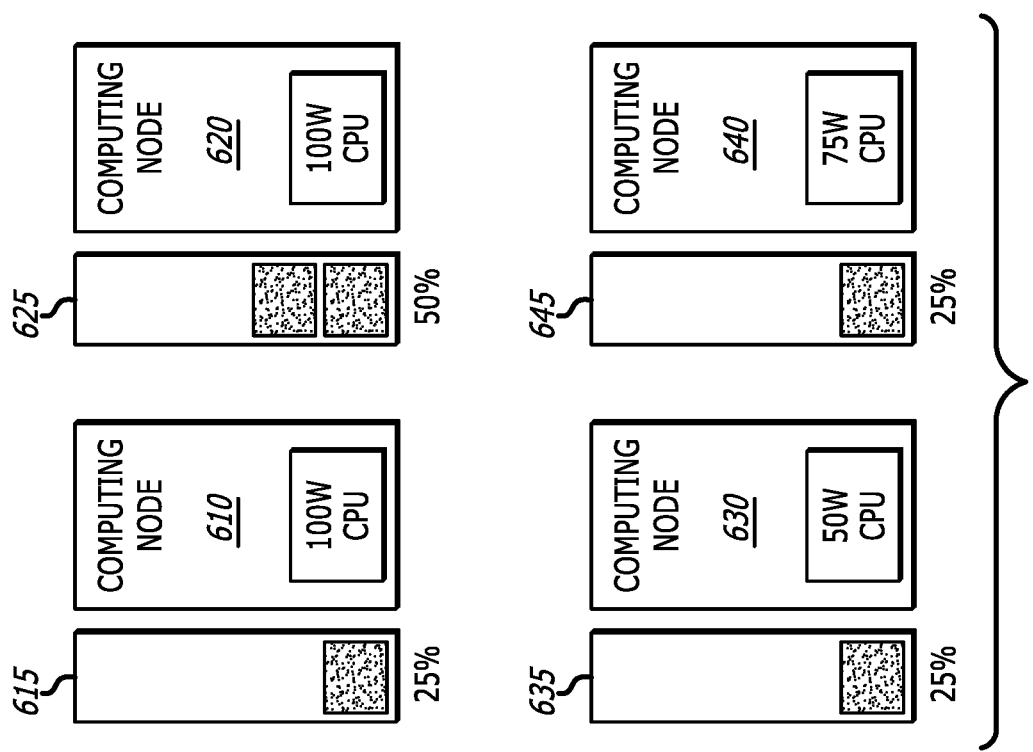
FIG. 6A is a conceptual illustration of a plurality of computing nodes with varying energy usage in accordance with various embodiments of the disclosure.

Referring to FIG. 6A, a conceptual illustration of a plurality of computing nodes with varying energy usage in accordance with various embodiments of the disclosure is shown. In many embodiments, a plurality of computing nodes may have resources allocated to them within a resource queue. These resource queues may be conceptually understood as the amount of bandwidth the respective computing node can process at once. Thus, the conceptual embodiments of FIGS. 6A and 6B have resource queues that can handle resources up to one-hundred percent capacity, which can be indicated by up to four resources. However, as those skilled in the art will recognize, these embodiments are simplified for clarity and explanation purposes.

Specifically, in the embodiment depicted in FIGS. 6A and 6B, a first computing node 610 has a first resource queue 615 that is twenty-five percent utilized, a second computing node 620 is associated with a second resource queue 625 that is fifty percent utilized, a third computing node 630 has a corresponding third resource queue 635 that is twenty-five percent utilized and a fourth computing node 640 that is paired with a fourth resource queue 645 that is also twenty-five percent utilized. Additionally, each computing node has an associated processor (shown as "CPU") that can vary depending on the specific computing node.

Each processor can be configured to operate at different energy levels. Specifically, the first computing node 610 and the second computing node 620 have a 100 W CPU processor, while the third computing node 630 has a 50 W CPU processor, and the fourth computing node 640 has a 75 W CPU processor. As those skilled in the art will recognize, computing nodes with processors rated for lower energy usage may be able to process various resources more efficiently than a computing node with a higher energy usage processor. For example, while the first computing node 610 and third computing node 630 both have resource queues that are twenty-five percent utilized, the third computing node 630 can perform similar tasks at roughly half the rate of energy usage of the first computing node 610. Thus, if there was a focus to increase the overall sustainability by reducing energy usage through the computing nodes, a reallocation may be necessary to optimize the energy usage.

Referring to FIG. 6B, a conceptual illustration of resource allocation based on energy usage in accordance with various embodiments of the disclosure is shown. In many embodiments, a sustainable power configuration may be applied to the plurality of computing nodes, such that the allocation of resources may be indicated. The embodiment depicted in FIG. 6B shows a reallocation of resources between a first computing node 610, second computing node 620, third computing node 630, and fourth computing node 640.

Specifically, because the third computing node 630 is configured with the most energy-efficient processor (shown as "CPU"), it may be reallocated with resources until it is corresponding third resource queue 635 is fully, one hundred percent utilized. In certain embodiments, the processor associated a computing node may be configured to be energy efficient at a first operating level when the resource queue is low but may increase overall energy expenditure as the resource queue increases in capacity. Thus, these embodiments may need to factor this into their calculations for reallocation.

As a result of the reallocation depicted in FIG. 6B, the first computing node 610 and second computing node 620 are now configured with corresponding first and second resource queues 615, 625 that are not utilized at all. This is due to the fact that increased energy usage within the processors renders their utilization inefficient unless it is determined that other more energy efficient processors are fully utilized. The fourth computing node 640 can have a corresponding fourth resource queue 645 that is twenty-five percent utilized since the third computing node 630 is fully utilized. Since the fourth computing node 640 has a processor that utilizes less power during operation compared to the first computing node 610 and second computing node 620, the remaining resources are allocated to the fourth computing node 640 for processing.

Referring to FIG. 6C, a conceptual illustration of a plurality of computing nodes with varying power source types in accordance with various embodiments of the disclosure is shown. In many embodiments, a plurality of computing nodes may have resources allocated to them within a resource queue. As described above with respect to the embodiment described in FIG. 6A, these resource queues may be conceptually understood as the amount of bandwidth the respective computing node can process at once. Thus, the conceptual embodiments of FIGS. 6C and 6D have resource queues that can handle resources up to one-hundred percent capacity, which can be indicated by up to four resources. However, as those skilled in the art will recognize, these embodiments are simplified for clarity and explanation purposes.

Specifically, in the embodiment depicted in FIGS. 6C and 6D, a first computing node 650 has a first resource queue 655 that is fifty percent utilized, a second computing node 660 is associated with a second resource queue 665 that is also fifty percent utilized, a third computing node 670 has a corresponding third resource queue 675 that is twenty-five percent utilized and a fourth computing node 680 that is paired with a fourth resource queue 685 that is also twenty-five percent utilized. Additionally, each computing node has an associated power source type that can vary depending on the specific computing node.

Each power source type can have varying levels of sustainability and associated negative environmental impacts, as described above. Specifically, the first computing node 650 and the fourth computing node 680 are powered by a solar power source type, while the second computing node 660 and third computing node 670 are powered by a non-sustainable coal-based power source type. As those skilled in the art will recognize, computing nodes can be powered from a variety of power source types, and the power source types themselves may change, even throughout the day. These changes may indicate that a reallocation of resources should occur. Specifically, to the embodiment depicted in FIG. 6C, it may be desired to reallocate resources such that the processing of the resources is done in locations that are powered by more sustainable power types.

Referring to FIG. 6D, a conceptual illustration of resource allocation based on power source types in accordance with various embodiments of the disclosure is shown. In many embodiments, a sustainable power configuration may be applied to the plurality of computing nodes, such that the allocation of resources may be indicated. The embodiment depicted in FIG. 6D shows a reallocation of resources between a first computing node 650, second computing node 660, third computing node 670, and fourth computing node 680.

Specifically, because the first computing node 650 and fourth computing node 680 are powered by a sustainable power source type, resources may be reallocated until their corresponding first resource queue 655 and fourth resource queue 685 are fully, one hundred percent utilized. Conversely, the second computing node 660 and third computing node 670 are deallocated resources such that the second resource queue 665 and third resource queue 675 are empty at zero percent utilization.

Although specific embodiments for resource allocation are described above with respect to FIGS. 6A-6D, any of a variety of systems and/or processes may be utilized in accordance with embodiments of the disclosure. As one of ordinary skill in the art will readily recognize, the examples and technologies provided above are simply for clarity and explanation purposes and can include many additional concepts and variations. The elements depicted in FIGS. 6A-6D may also be interchangeable with other elements of FIGS. 1-5B and 7-11 as required to realize a particularly desired embodiment.

Referring to FIG. 7, a flowchart depicting a process 700 for generating and applying an updated sustainable configuration in accordance with various embodiments of the disclosure is shown. In many embodiments, the process 700 can receive infrastructure data associated with a plurality of computing nodes (block 710). As described above, a managed network may have a plurality of computing nodes distributed throughout multiple devices, both physical and virtual. Data related to this infrastructure can be transmitted to an infrastructure monitor or other ecosystem management tool.

In additional embodiments, the process 700 can generate a plurality of health metrics based on the infrastructure data (block 720). As indicated previously, health metrics can be data that indicates or can be used to derive the health of various computing nodes. For example, health metrics can be data that indicates whether a computing node is experiencing performance issues or, alternatively, performing at or near an optimal level. In further embodiments, health data can be utilized to determine the overall energy usage to process the plurality of resources, such as the utilization of a resource queue. In some embodiments, health metrics may be generated by an infrastructure monitor or other ecosystem management tool.

In a number of embodiments, the process 700 can gather sustainability data associated with the plurality of computing nodes (block 730). Sustainability data may be gathered from various public or third-party resources, such as, but not limited to, databases regarding power source types of various locations. However, computing nodes may be configured to gather and transmit sustainability data to an infrastructure monitor or other ecosystem management tool. This data may comprise processor type, processor utilization, current power usage, historical power usage, etc.

In further embodiments, the process 700 can determine if an updated sustainable configuration is available (block 740). As explained in more detail below, various events may occur that indicate that a reevaluation of the current network configuration is needed. In response to one or more of those events, various steps can occur such that alternative power configurations can be evaluated. In some embodiments, when it is determined that an alternative power configuration can yield a higher level of sustainability. In response, the process 700 can generate an updated sustainable configuration (block 750). In more embodiments, the process 700 can apply the updated sustainable configuration to the plurality of computing nodes (block 760). The application of this can result in one or more resources being reallocated amongst the plurality of computing nodes within the managed network.

Although a specific process 700 for generating and applying an updated sustainable configuration is described above with respect to FIG. 7, any of a variety of systems and/or processes may be utilized in accordance with embodiments of the disclosure. For example, the process may be undertaken within a single device or ecosystem management tool, but may also be realized through multiple devices deployed across the network. The elements depicted in FIG. 7 may also be interchangeable with other elements of FIGS. 1-6D and 8-11 as required to realize a particularly desired embodiment.

Figure 8A:
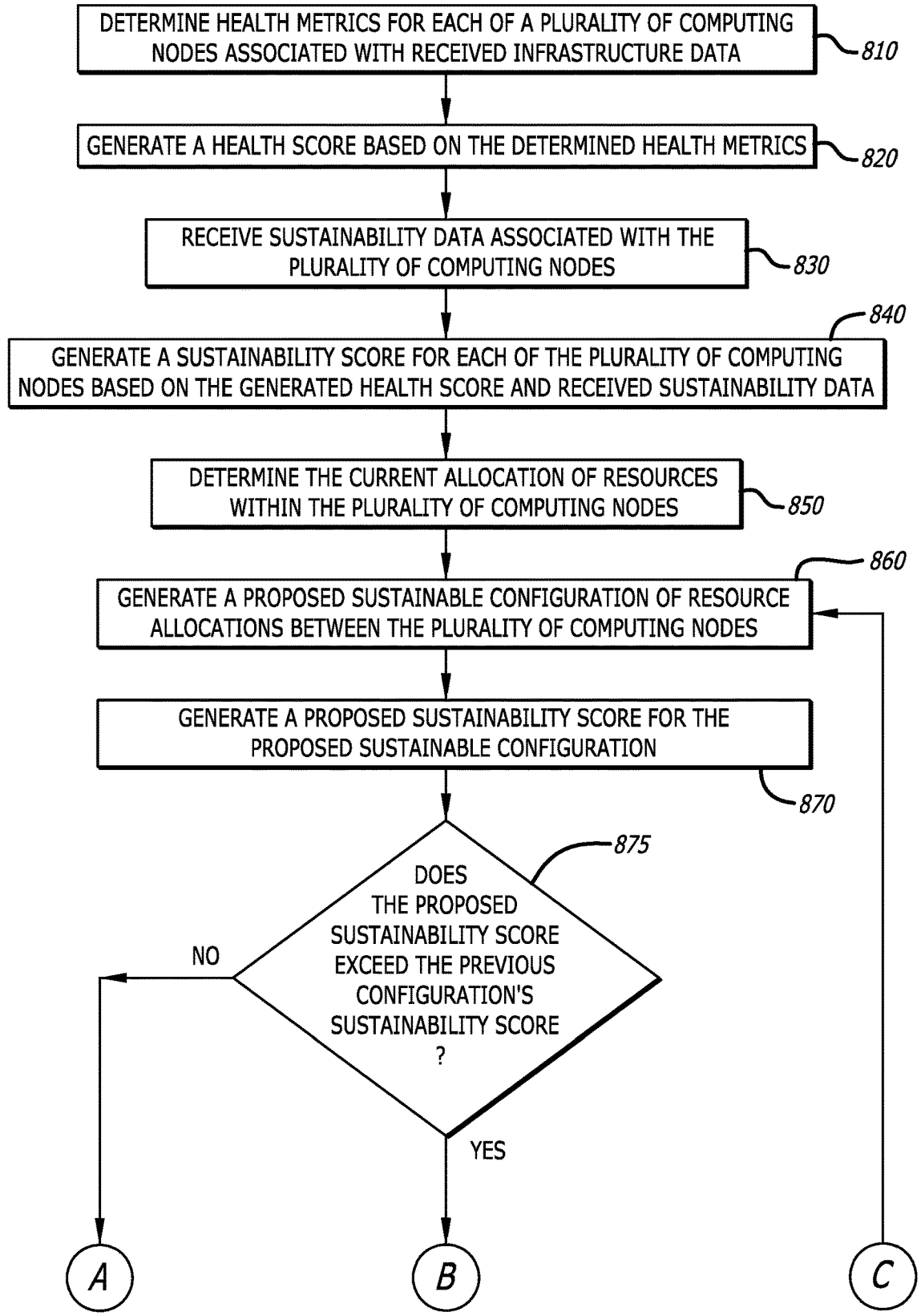
FIGS. 8A-8B is a flowchart depicting a process for determining if resource allocation is indicated in accordance with various embodiments of the disclosure.
Figure 8B:
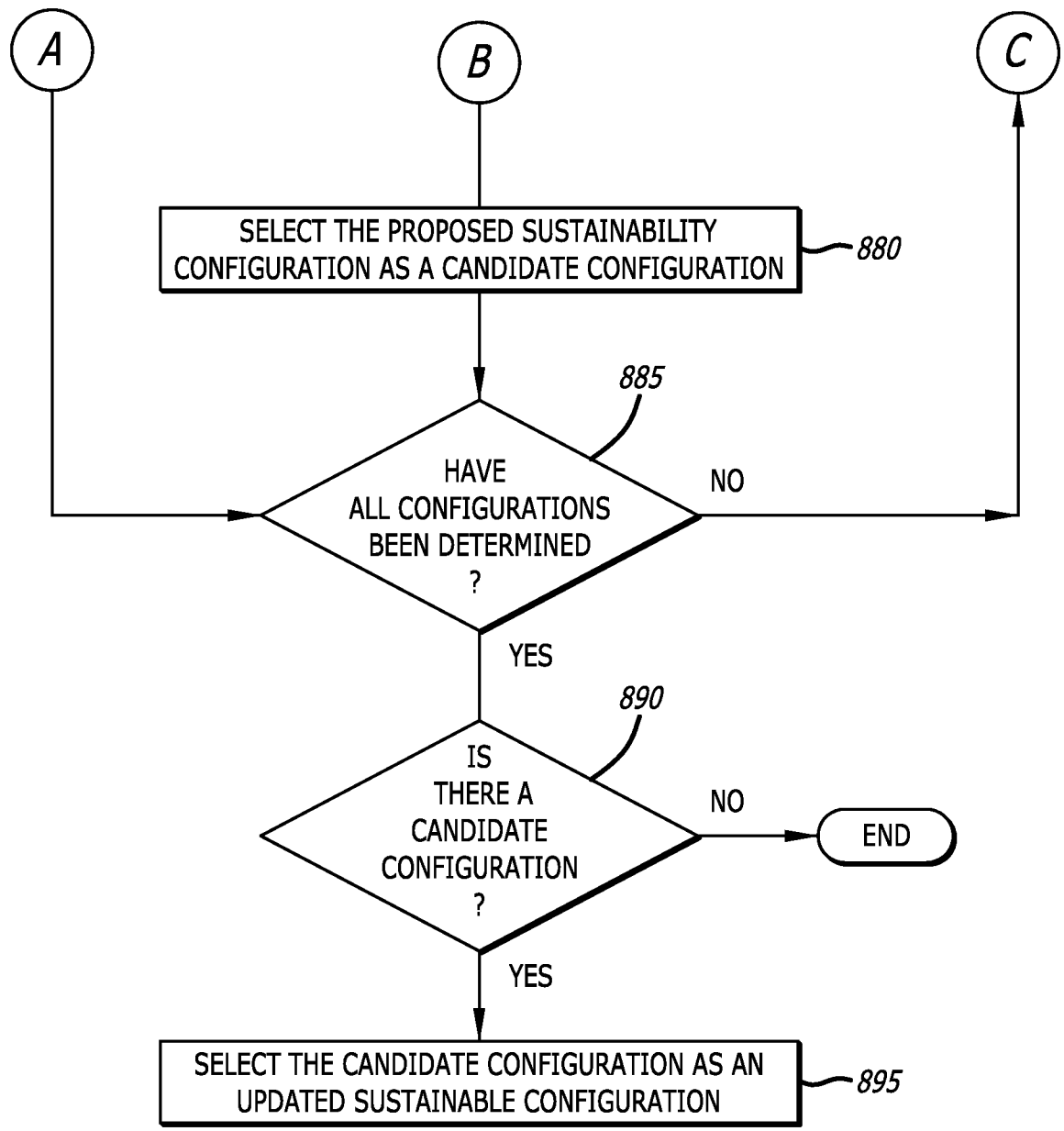

Referring to FIGS. 8A-8B, a flowchart depicting a process 800 for determining if resource allocation is indicated in accordance with various embodiments of the disclosure is shown. In many embodiments, the process 800 can determine health metrics for each of a plurality of computing nodes associated with received infrastructure data (block 810). This may be similar to the processes discussed above with respect to FIG. 7.

In further embodiments, the process 800 can generate a health score based on the determined health metrics (block 820). As described above, a health score can be a score, such as a numerical value, that indicates the health of a computing node to host a plurality of resources. For example, a low health score may indicate that a computing node is experiencing performance issues, while a high health score can indicate that a computing node is performing at an optimal or near optimal levels.

In a number of embodiments, the process 800 can receive sustainability data associated with the plurality of computing nodes (block 830). As discussed above with respect to FIG. 7, sustainability data may be received from third party or external data stores and/or may be received from the plurality of computing nodes. Based on this, various embodiments of the process 800 can generate a sustainability score for each of the plurality of computing nodes based on the generated health score and the received sustainability data (block 840). In certain embodiments, the health score can include one or more data points that can yield insight into the overall sustainability of the device. For example, health scores may indicate the overall energy usage of the processors, or the ambient heat being generated by the computing nodes.

In additional embodiments, the process 800 can determine the current allocation of resources within the plurality of computing nodes (block 850). This determination may be accomplished through polling the computing nodes within the managed network or may be realized by accessing a previous configuration that was applied to the plurality of computing nodes. Subsequently, various embodiments of the process 800 can generate a proposed sustainable configuration of resource allocations between the plurality of computing nodes (block 860). This generation can be a random reconfiguration of resources or may be based on one or more heuristics or machine-learning processes.

In response to a proposed sustainable configuration being generated, the process 800 can generate a proposed sustainability score for the proposed sustainable configuration (block 870). Similar to a health score, the sustainability score can be a number or other categorization that can be utilized to evaluate the overall sustainability of the configuration of resources amongst the plurality of computing nodes. Subsequently, the process 800 can determine if the proposed sustainability score exceeds the previous configuration's sustainability score (block 875).

As those skilled in the art will recognize, evaluating various scores may comprise comparing the two scores and selecting one with a higher value. However, the specific evaluation may include a variety of factors and/or steps. For example, in certain embodiments, the first and second sustainability scores may be configured to be associated with one or more negative environmental impacts and comprises summing up the aggregate negative environmental impacts of the plurality of computing nodes. In these embodiments, a lower sustainability score is better. In some embodiments, the first and second sustainability scores may be configured to be associated with one or more negative environmental impacts and comprises summing up the aggregate avoidance of negative environmental impacts of the plurality of computing nodes. In these embodiments, a higher sustainability score is better. Thus, the determination may involve comparing and selecting either the higher or lower score depending on the desired application.

When the proposed sustainability score is not evaluated as being more sustainable than the current sustainable configuration, the process 800 can further evaluate if all available configuration permutations have been determined (block 885). Alternatively, when the proposed sustainability score is evaluated as being more sustainable (either through a higher or lower score as described above) the process 800 can select the proposed sustainable configuration as a candidate configuration (block 880). However, just because one candidate configuration was determined, more and even better sustainable configurations may still exist. As such, the process 800 can evaluate if all configurations have been determined (block 885).

When there are more potential combinations of allocated resources within the managed network, the process 800 may again generate a proposed sustainable configuration of resource allocations between the plurality of computing nodes (block 860). This can again lead to a generation of a sustainability score (block 870). However, when all configurations have been determined, the process 800 can further evaluate if a candidate configuration was determined (block 890). If the process 800 did not yield any candidate configurations, that indicates that the current sustainable configuration is optimal and should not currently change, thus ending the process 800. On the other hand, when a candidate configuration was determined, the process 800 can select the candidate configuration as an updated sustainable configuration (block 895). By generating an updated sustainable configuration, the process 800 can indicate that resource allocation is indicated within the managed network.

Although a specific process 800 for determining if resource allocation is indicated is described above with respect to FIGS. 8A-8B, any of a variety of systems and/or processes may be utilized in accordance with embodiments of the disclosure. For example, the process may not generate proposed sustainable configurations by permutating through various random configurations but may have a specific narrow set of heuristics or machine-learning processes that can focus, and therefore reduce, the number of proposed sustainable configurations that need to be evaluated before selecting a candidate configuration. The elements depicted in FIGS. 8A-8B may also be interchangeable with other elements of FIGS. 1-7 and 9-11 as required to realize a particularly desired embodiment.

Figure 9:
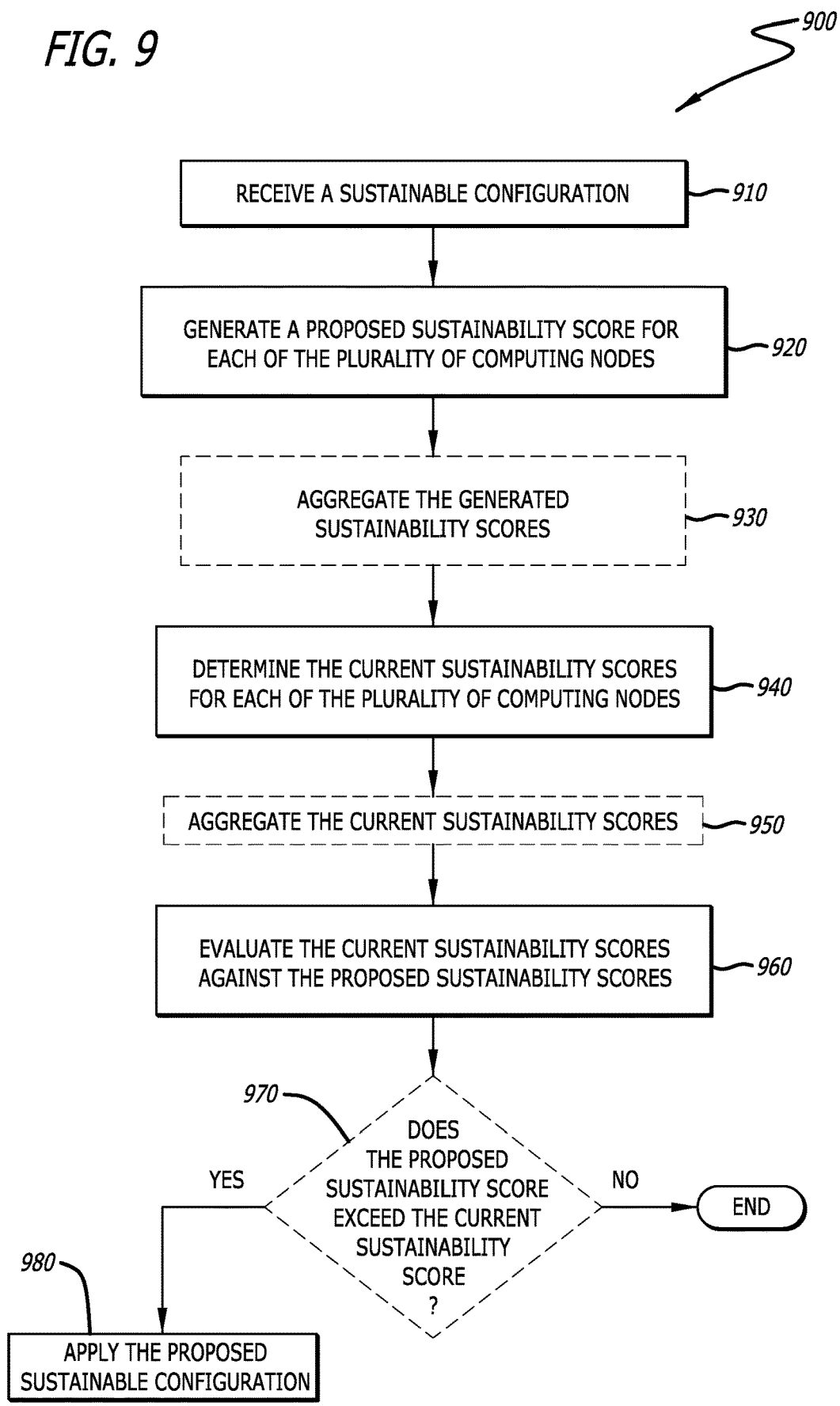
FIG. 9 is a flowchart depicting a process for determining a sustainable configuration in accordance with various embodiments of the disclosure.

Referring to FIG. 9, a flowchart depicting a process 900 for determining a sustainable configuration in accordance with various embodiments of the disclosure is shown. In many embodiments the process of reallocating resources may be separated into various components and/or logics. For example, as shown in the embodiments depicted in FIGS. 5A and 5B, an infrastructure monitor may receive various infrastructure data from the plurality of computing nodes while a resource manager applies an updated sustainable configuration to the plurality of devices. However, the operations between these steps may vary between which device performs them. In that respect, the embodiment of the process 900 in FIG. 9 can be considered from the perspective of a resource manager. In various embodiments, the operations not described within the process 900 may be carried out by an infrastructure monitor.

In a number of embodiments, the process 900 can receive a sustainable configuration (block 910). The sustainable configuration may be a proposed sustainable configuration that needs to be evaluated against the current sustainability configuration already deployed. To carry out an evaluation, the process 900 can generate a proposed sustainability score for each of the plurality of computing nodes (block 920). In these embodiments, the sustainability score may be generated by creating a sub-score that is associated with each computing node. In some optional embodiments, the process 900 can aggregate the generated sustainability scores (block 930). In this way, a single score may be utilized for eventual comparison instead of multiple scores.

In further embodiments, the process 900 can determine the current sustainability scores for each of the plurality of computing nodes (block 940). As described above, the determination may be done by calculating scores at decision time, or some embodiments may simply access scores that were previously generated, such as when the current configuration was a proposed configuration, etc. Again, optional embodiments may aggregate the current sustainability scores (block 950). This can be done to reduce the subsequent evaluations.

In more embodiments, the process 900 can evaluate the current sustainability scores against the proposed sustainability scores (block 960). This evaluation can lead to optional determinations on whether the proposed sustainability score exceed the current sustainability score (block 970). As discussed above, the optional embodiments may be substituted for other embodiment options that can determine if the proposed sustainability score is less than the current sustainability score. These options are a function of the type of data is being tracked and/or represented by the sustainability score.

If the proposed sustainability score does not exceed the current sustainability score, then the process can end without further action. However, in a variety of embodiments, when the proposed sustainability score does exceed the current sustainability score, the process 900 can apply the proposed sustainable configuration (block 980). In certain embodiments, this application may be to select the configuration that will be the candidate configuration. However, in certain embodiments, the application of the proposed sustainable configuration can comprise carrying out a reallocation process between the plurality of computing nodes. This process is described in further detail within the discussion of FIG. 10.

Although a specific process 900 for determining if resource allocation is indicated is described above with respect to FIG. 9, any of a variety of systems and/or processes may be utilized in accordance with embodiments of the disclosure. For example, the process may not necessarily aggregate all scores down to one. Indeed, certain grouping of scores may occur and partial aggregation can be utilized if certain sustainability aspects are to be focused on. The elements depicted in FIG. 9 may also be interchangeable with other elements of FIGS. 1-8 and 10-11 as required to realize a particularly desired embodiment.

Figure 10:
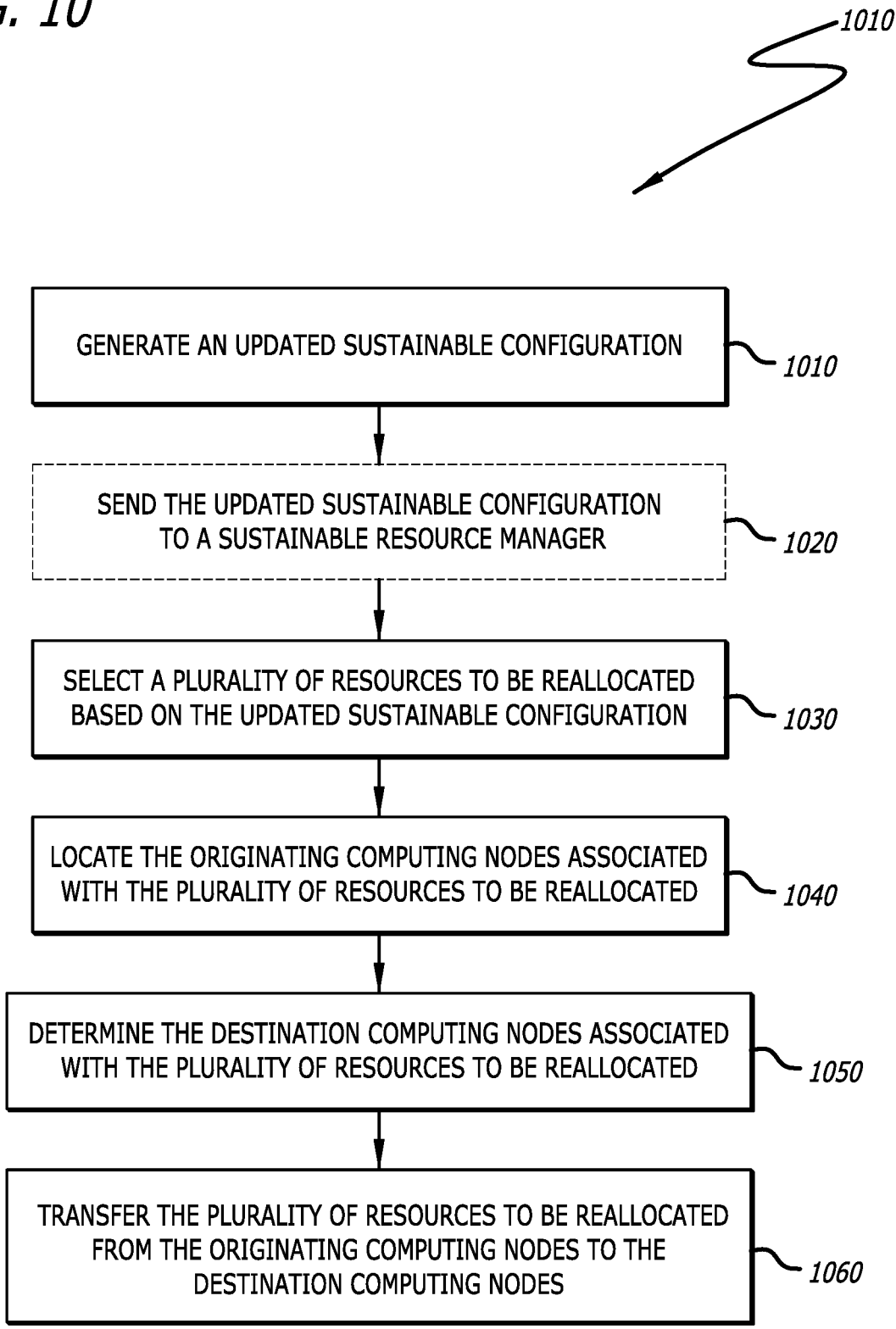
FIG. 10 is a flowchart depicting a process for reallocating resources between various computing nodes in accordance with various embodiments of the disclosure.

Referring to FIG. 10, a flowchart depicting a process 1000 for reallocating resources between various computing nodes in accordance with various embodiments of the disclosure is shown. As discussed above, various embodiments described herein may be configured in a number of ways. In some embodiments, a resource manager may work in concert with an infrastructure monitor to reallocate resources in a more sustainable way by generating and applying sustainable configurations to a plurality of computing nodes. In other embodiments, the same operations may be carried out by a single device, logic, and/or ecosystem management tool.

In many embodiments, the process 1000 may generate an updated sustainable configuration (block 1010). As described above, the updated sustainable configuration is often generated such that it will make the plurality of computing nodes operate in a more sustainable way once applied. In optional embodiments, the process 1000 can send the updated sustainable configuration to a sustainable resource manager (block 1020). However, in other optional embodiments, the remaining steps within the process 1000 can be carried out by a single device, logic, and/or ecosystem management tool.

In further embodiments, the process 1000 can select a plurality of resources to be reallocated based on the updated sustainable configuration (block 1030). As shown above with respect to the discussion of FIGS. 6A-6D, certain resources may already be operating at an optimized or near-optimized sustainable level. As such, not all resources may need to be moved during a reallocation procedure.

In additional embodiments, the process 1000 can locate the originating computing nodes associated with the plurality of resources to be allocated (block 1040). For the resources that are selected to be moved during the reallocation procedure, each must be assigned to or otherwise associated with at least one of a plurality of computing nodes and then must subsequently be moved to a new computing node. The computing nodes that comprise at least one resource marked for movement during reallocation. Likewise, in more embodiments, the process 1000 can determine the destination computing nodes that are associated with the plurality of resources (block 1050).

In response to determining the originating computing nodes and the destination computing nodes, various embodiments of the process 1000 can transfer the plurality of resources to be reallocated form the originating computing nodes to the destination computing nodes (block 1060). In this way, the overall sustainability of the managed network with the plurality of computing nodes can be increased. In certain embodiments, the transfer may occur immediately, but may also be carried out during one or more downtimes.

Figure 11:
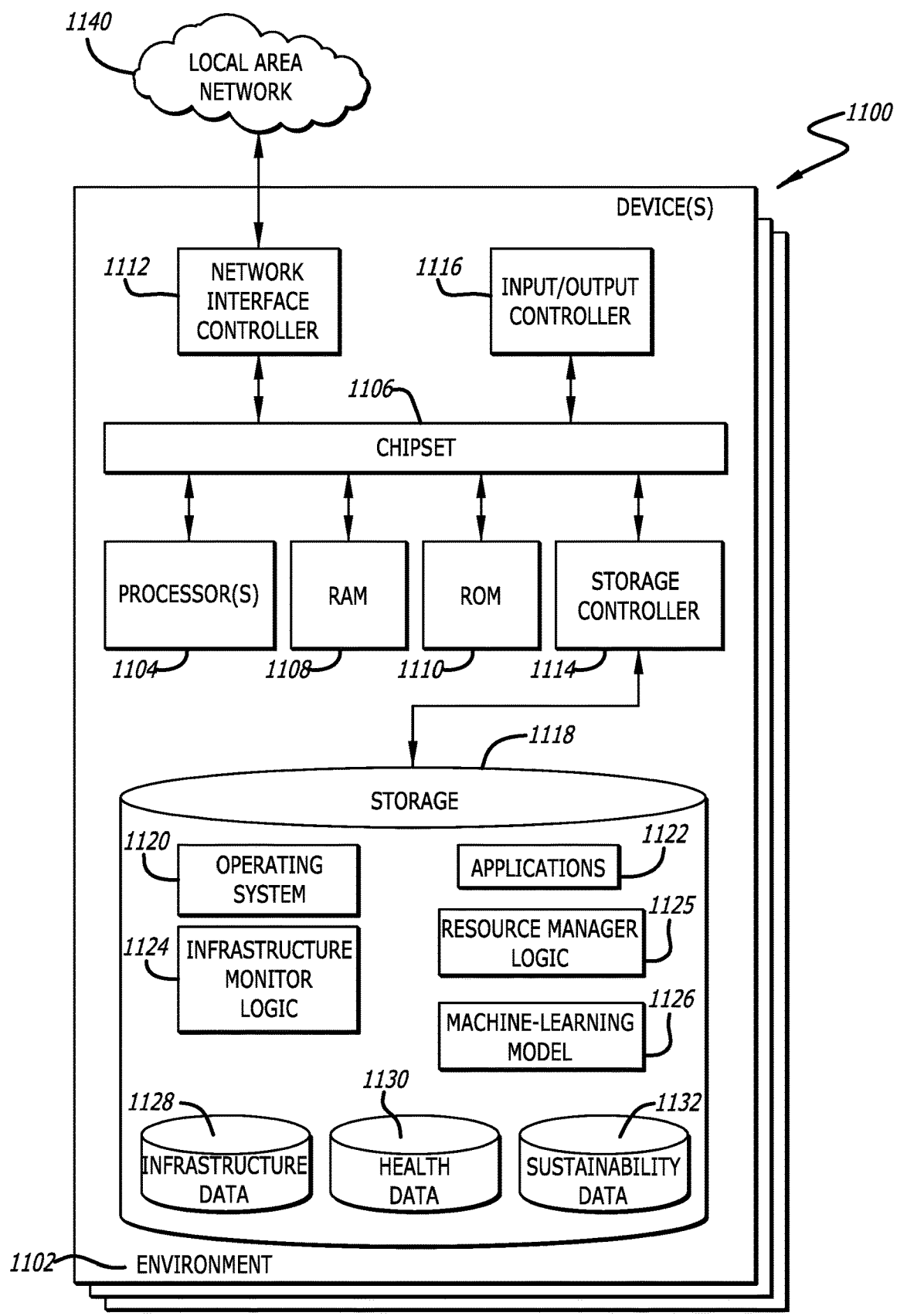
FIG. 11 is a conceptual block diagram of a device suitable for use in a sustainability-related workflow management system in accordance with various embodiments of the disclosure.

FIG. 11 is a conceptual block diagram of a device 1100 suitable for use in a sustainability-related workflow management system in accordance with various embodiments of the disclosure. The embodiment of the conceptual block diagram depicted in FIG. 11 can illustrate a conventional server computer, workstation, desktop computer, laptop, tablet, network appliance, e-reader, smartphone, or other computing device, and can be utilized to execute any of the application and/or logic components presented herein. The device 1100 may, in some examples, correspond to physical devices or to virtual resources described herein.

In many embodiments, the device 1100 may include an environment 1102 such as a baseboard or "motherboard," in physical embodiments that can be configured as a printed circuit board with a multitude of components or devices connected by way of a system bus or other electrical communication paths. Conceptually, in virtualized embodiments, the environment 1102 may be a virtual environment that encompasses and executes the remaining components and resources of the device 1100. In more embodiments, one or more controller(s) 1104, such as, but not limited to, central processing units (CPUs), processors, etc. that can be configured to operate in conjunction with a chipset 1106. The controller(s) 1104 can be standard programmable CPUs that perform arithmetic and logical operations necessary for the operation of the device 1100.

In additional embodiments, the controller(s) 1104 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In certain embodiments, the chipset 1106 may provide an interface between the controller(s) 1104 and the remainder of the components and devices within the environment 1102. The chipset 1106 can provide an interface to a random-access memory (RAM 1108), which can be used as the main memory in the device 1100 in some embodiments. In a number of embodiments, the memory can be communicatively coupled to the controller(s) 1104 to carry out one or more instructions. The chipset 1106 can further be configured to provide an interface to a computer-readable storage medium such as a read-only memory (ROM 1110) or non-volatile RAM (NVRAM) for storing basic routines that can help with various tasks such as, but not limited to, starting up the device 1100 and/or transferring information between the various components and devices. The ROM 1110 or NVRAM can also store other application components necessary for the operation of the device 1100 in accordance with various embodiments described herein.

Different embodiments of the device 1100 can be configured to operate in a networked environment using logical connections to remote computing devices and computer systems through a network, such as the network 1140. The chipset 1106 can include functionality for providing network connectivity through a network interface controller 1112, which may provide access to external devices through, for example, a plurality of communication ports such as, but not limited to, a network interface card (NIC). A NIC may comprise a gigabit Ethernet adapter or similar component. The plurality of communication ports can be capable of connecting or otherwise coupling the device 1100 to other devices over the network 1140. It is contemplated that multiple communication ports, such as NICs may be present in the device 1100, connecting the device to other types of networks and remote systems.

In further embodiments, the device 1100 can be connected to a storage 1118 that provides non-volatile storage for data accessible by the device 1100. The storage 1118 can, for example, store an operating system 1120, applications 1122, and data, which are described in greater detail below. The storage 1118 can be connected to the environment 1102 through a storage controller 1114 connected to the chipset 1106. In certain embodiments, the storage 1118 can consist of one or more physical storage units. The storage controller 1114 can interface with the physical storage units through a serial attached SCSI (SAS) interface, a serial advanced technology attachment (SATA) interface, a fiber channel (FC) interface, or other type of interface for physically connecting and transferring data between computers and physical storage units.

The device 1100 can store data within the storage 1118 by transforming the physical state of the physical storage units to reflect the information being stored. The specific transformation of physical state can depend on various factors. Examples of such factors can include, but are not limited to, the technology used to implement the physical storage units, whether the storage 1118 is characterized as primary or secondary storage, and the like.

For example, the device 1100 can store information within the storage 1118 by issuing instructions through the storage controller 1114 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 1100 can further read or access information from the storage 1118 by detecting the physical states or characteristics of one or more particular locations within the physical storage units.

In addition to the storage 1118 described above, the device 1100 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 1100. In some examples, the operations performed by a cloud computing network, and or any components included therein, may be supported by one or more devices similar to device 1100. Stated otherwise, some or all of the operations performed by the cloud computing network, and or any components included therein, may be performed by a device 1100 or a plurality of devices operating in a cloud-based arrangement.

By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 1118 can store an operating system 1120 utilized to control the operation of the device 1100. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 1118 can store other system or application programs and data utilized by the device 1100.

In various embodiment, the storage 1118 or other computer-readable storage media is encoded with computer-executable instructions which, when loaded into the device 1100, may transform it from a general-purpose computing system into a special-purpose computer capable of implementing the embodiments described herein. These computer-executable instructions may be stored as application 1122 and transform the device 1100 by specifying how the controller(s) 1104 can transition between states, as described above. In some embodiments, the device 1100 has access to computer-readable storage media storing computer-executable instructions which, when executed by the device 1100, perform the various processes described above with regard to FIGS. 1-10. In more embodiments, the device 1100 can also include computer-readable storage media having instructions stored thereupon for performing any of the other computer-implemented operations described herein.

In still further embodiments, the device 1100 can also include one or more input/output controllers 1116 for receiving and processing input from a number of input devices, such as a keyboard, a mouse, a touchpad, a touch screen, an electronic stylus, or other type of input device. Similarly, an input/output controller 1116 can be configured to provide output to a display, such as a computer monitor, a flat panel display, a digital projector, a printer, or other type of output device. Those skilled in the art will recognize that the device 1100 might not include all of the components shown in FIG. 11 and can include other components that are not explicitly shown in FIG. 11, or might utilize an architecture completely different than that shown in FIG. 11.

As described above, the device 1100 may support a virtualization layer, such as one or more virtual resources executing on the device 1100. In some examples, the virtualization layer may be supported by a hypervisor that provides one or more virtual machines running on the device 1100 to perform functions described herein. The virtualization layer may generally support a virtual resource that performs at least a portion of the techniques described herein.

In many embodiments, the device 1100 can include an infrastructure monitor logic 1124, that can be configured to perform one or more of the various steps, processes, operations, and/or other methods that are described above. Often, the infrastructure monitor logic 1124 can be a set of instructions stored within a non-volatile memory that, when executed by the processor(s)/controller(s) 1104 can carry out these steps, etc. In some embodiments, the v infrastructure monitor logic 1124 may be a client application that resides on a network-connected device, such as, but not limited to, a server, switch, or a personal or mobile computing device. In these embodiments, the infrastructure monitor logic 1124 can facilitate the reception and/or gathering of various sources of data. In more embodiments, the infrastructure monitor logic 1124 can generate various scores and metrics with that data. In additional embodiments, the infrastructure monitor logic 1124 may also generate or otherwise facilitate the creation of proposed sustainable configurations for evaluation. In still further embodiments, the infrastructure monitor logic 1124 can evaluate the proposed sustainable configurations based on the one or more scores and data sources available. Finally, in more embodiments, the infrastructure monitor logic 1124 can select and apply an updated sustainable configuration to the network by directing the reallocation of resources. However, in alternative embodiments, the directing of the reallocation may be handled by a different logic.

In a variety of embodiments, the device 1100 can include a resource manager logic 1124, that can be configured to perform one or more of the various steps, processes, operations, and/or other methods that are described above. Often, the resource manager logic 1125 can be a set of instructions stored within a non-volatile memory that, when executed by the processor(s)/controller(s) 1104 can carry out these steps, etc. In some embodiments, the resource manager logic 1125 may be a client application that resides on a network-connected device, such as, but not limited to, a server, switch, personal or mobile computing device. In certain embodiments, the infrastructure monitor logic 1125 can direct the reallocation of resources across computing nodes within a network based on receiving an updated sustainable configuration. However, in additional embodiments, the resource manager logic 1125 can generate various scores and metrics with data provided by external sources, such as an infrastructure monitor logic 1124. In additional embodiments, the resource manager logic 1125 may also generate or otherwise facilitate the creation of proposed sustainable configurations for evaluation. In still further embodiments, the resource manager logic 1125 can evaluate the proposed sustainable configurations based on the one or more scores and data sources available. Finally, in more embodiments, the resource manager logic 1125 can select and apply an updated sustainable configuration to the network by directing the reallocation of resources. Indeed, the balance of operations carried out by the infrastructure monitor logic 1124 and the resource manager logic 1125 can vary based on different applications and/or deployments.

In a number of embodiments, the storage 1118 can include meeting infrastructure data 1128. As described above, infrastructure data 1128 can be received from various computing nodes and/or devices across the network. In many embodiments, infrastructure data 1128 can include inventory data or telemetry data related to the network. This infrastructure data 1128 may be utilized by an infrastructure monitor to generate predictions or scores/metrics related to the health of the network. Indeed, infrastructure data 1128 can include any relevant data related to the network and associated network devices and can be formatted in a variety of ways to realize the desired application.

In various embodiments, the storage 1118 can include health data 1130. As described above, a number of embodiments may generate health data 1130 to evaluate or score one or more aspects or devices of the network. The health data 1130 may be generated based on the infrastructure data 1128. In this way, data related to the overall infrastructure can be formatted, or otherwise leveraged to generate insights into the network or device's current state. In more embodiments, the health data 1130 may be stored as historical records as well, allowing data points for prediction of future events, power usage, and resource processing capabilities.

In still more embodiments, the storage 1118 can include sustainability data 1132. As described above in the discussion of FIG. 1, sustainability attribute data can include sustainability attributes of various devices, elements, and other components of a virtual meeting network. The sustainability data 1132 may comprise both capability data related to various devices but can also include the power source type associated with each device within a network proposed or being utilized for resource processing. In some embodiments, the sustainability data 1132 can include historical records such that decisions or inferences can be generated without all current real-time data, or to make a prediction of upcoming network conditions.

In some embodiments, the sustainability data 1132 can include various metrics as described above, such as, but not limited to, a server efficiency metric, a $CO_2$ efficiency metric, a real-time power efficiency metric, a network energy cost metric, and/or a network efficiency metric. Those skilled in the art will recognize that other sustainability-related metrics are possible for calculation based off of the available infrastructure data, health data, and other third-party data sources. Any variety of sustainability data 1132 may be utilized or formatted for use within various embodiments described herein to realize the desired application.

Finally, in many embodiments, data may be processed into a format usable by one or more machine-learning (ML) model(s) 1126 (e.g., feature vectors), and or other preprocessing techniques. The ML model(s) 1126 may be any type of ML model, such as any of various supervised models, reinforcement models, and/or unsupervised models. The ML model(s) 1126 may include one or more of linear regression models, logistic regression models, decision trees, Naïve Bayes models, neural networks, k-means cluster models, random forest models, and/or other types of ML model(s) 1126.

The ML model(s) 1126 can be configured to generate inferences to make predictions or draw conclusions from data. An inference can be considered the output of a process of applying a model to new data. This can occur by learning from infrastructure data, sustainability data, and/or health data and use that learning to predict future outcomes. These predictions are based on patterns and relationships discovered within the data. To generate an inference, the trained model can take input data and produce a prediction or a decision. The input data can be in various forms, such as images, audio, text, or numerical data, depending on the type of problem the model was trained to solve. The output of the model can also vary depending on the problem, and can be a single number, a probability distribution, a set of labels, a decision about an action to take, etc. Ground truth for the ML model(s) 1126 may be generated by human/administrator verifications, or may compare predicted outcomes with actual outcomes.

The ML model(s) 1126 may be configured to predict the usage and/or configurations of a better sustainability-optimized distribution of resources. Likewise, the ML model(s) 1126 may be configured in certain embodiments to predict upcoming events that may affect the sustainability of allocated resources. In many embodiments, the ML model(s) 1126 can be utilized to efficiently generate proposed sustainability configurations that can be evaluated for candidate configurations. Proposed configurations generated by the ML model(s) 1126 may, for instance, narrow down the reallocation options based on past data and upcoming events to focus the variations of configuration combinations needed for evaluation. In this way, updated sustainable configurations may be generated at a faster rate than simple heuristic or random resource allocation choices.

Although a specific embodiment for a device suitable for carrying out the various steps, processes, methods, and operations described above is discussed with respect to FIG. 11, any of a variety of systems and/or processes may be utilized in accordance with embodiments of the disclosure. For example, the device may be virtualized or disposed as a logic and data stores within a mobile or personal general computing device, allowing for the transformation of the device, upon execution by a processor/controller, to a virtual meeting device capable of dynamic reduced size video transmission data rate within one or more video transmissions. The elements depicted in FIG. 11 may also be interchangeable with other elements of FIGS. 1-10 as required to realize a particularly desired embodiment.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:
   a processor;
   at least one network interface controller configured to provide access to a plurality of devices over a network; and
   a memory communicatively coupled to the processor, wherein the memory comprises a sustainability-related workflow management logic configured to:
      receive infrastructure data associated with a plurality of computing nodes;
      generate a plurality of health metrics based on the infrastructure data;
      gather sustainability data associated with the plurality of computing nodes;
      determine if an updated sustainable configuration is available;

generate an updated sustainable configuration; and
apply the updated sustainable configuration to the plurality of computing nodes.

2. The device of claim 1, wherein the plurality of health metrics comprises at least a health score for each of the plurality of computing nodes.

3. The device of claim 2, wherein the sustainability-related workflow management logic is further configured to generate a sustainability score for each of the plurality of computing nodes based on a generated health score and the received sustainability data.

4. The device of claim 3, wherein determining if an updated sustainable configuration is available comprises:
determining a current allocation of resources within the plurality of computing nodes;
generating a proposed sustainable configuration with a reallocation of the resources between the plurality of computing nodes;
evaluating the proposed sustainable configuration against the current allocation of resources; and
selecting the proposed sustainable configuration, in response to the proposed sustainable configuration exceeding the current allocation of resources, as a candidate sustainable configuration suitable to apply to the plurality of computing nodes.

5. The device of claim 4, wherein the current allocation of resources is scored with a first score and the proposed sustainable configuration is scored with a second score.

6. The device of claim 5, wherein evaluating the proposed sustainable configuration against the current allocation of resources comprise comparing the first score and second score.

7. The device of claim 6, wherein the first score and second score are associated with one or more negative environmental impacts and comprises summing up an aggregate negative environmental impacts of the plurality of computing nodes.

8. The device of claim 7, wherein the proposed sustainable configuration is selected as a candidate sustainable configuration when the first score exceeds the second score.

9. The device of claim 6, wherein the first score and second score are associated with one or more negative environmental impacts and comprises summing up an aggregate avoidance of negative environmental impacts of the plurality of computing nodes.

10. The device of claim 7, wherein the proposed sustainable configuration is selected as a candidate sustainable configuration when the second score exceeds the first score.

11. The device of claim 10, wherein determining if an updated sustainable configuration is available further comprises:
determining if all available configurations of the resources have been generated; and
generating, in response to all available configurations of the resources having been generated, the updated sustainable configuration based on the candidate sustainable configuration.

12. The device of claim 4, wherein applying the updated sustainable configuration comprises:
determining a plurality of resources for reallocation within the current allocation of resources;
locating one or more originating computing nodes associated with the plurality of resources for reallocation;
determining one or more destination computing nodes associated with the plurality of resources for allocation; and
transferring the plurality of resources for reallocation from the one or more originating computing nodes to the one or more destination computing nodes.

13. A method, comprising:
receiving infrastructure data associated with a plurality of computing nodes over a network;
generating a plurality of health metrics based on the infrastructure data;
gathering sustainability data associated with the plurality of computing nodes;
determining if an updated sustainable configuration is available for the plurality of computing nodes;
generating an updated sustainable configuration for the plurality of computing nodes; and
applying the updated sustainable configuration to the plurality of computing nodes.

14. The method of claim 13, wherein the plurality of health metrics comprises at least a health score for each of the plurality of computing nodes.

15. The method of claim 14, wherein the method further comprises generating a sustainability score for each of the plurality of computing nodes based on a generated health score and the received sustainability data.

16. The method of claim 15, wherein determining if an updated sustainable configuration is available comprises:
determining a current allocation of resources within the plurality of computing nodes;
generating a proposed sustainable configuration with a reallocation of the resources between the plurality of computing nodes;
evaluating the proposed sustainable configuration against the current allocation of resources; and
selecting the proposed sustainable configuration, in response to the proposed sustainable configuration exceeding the current allocation of resources, as a candidate sustainable configuration suitable to apply to the plurality of computing nodes.

17. A method, comprising:
determining, through an infrastructure monitor, if an updated sustainable configuration is available for a plurality of computing nodes over a network;
generating an updated sustainable configuration for the plurality of computing nodes wherein the updated sustainable configuration is associated with a plurality of resources suitable for reallocation; and
transferring the updated sustainable configuration to a sustainable resource manager wherein the sustainable resource manager is configured to:
locate one or more originating computing nodes associated with the plurality of resources to be reallocated;
determine one or more destination computing nodes associated with the plurality of resources to be allocated; and
transfer the plurality of resources to be reallocated from the one or more originating computing nodes to the destination computing nodes.

18. The method of claim 17, wherein the updated sustainable configuration is configured to reallocate resources to reduce overall energy usage within the computing nodes.

19. The method of claim 18, wherein the reduction in overall energy usage of the computing nodes is achieved by reallocating resources to computing nodes that have a more energy-efficient processor.

20. The method of claim 17, wherein the updated sustainable configuration is configured to reallocate resources to reduce energy usage from non-sustainable power source types within the computing nodes.

* * * * *